United States Patent
Prabhakar et al.

(10) Patent No.: US 11,561,925 B2
(45) Date of Patent: *Jan. 24, 2023

(54) TENSOR PARTITIONING AND PARTITION ACCESS ORDER

(71) Applicant: SambaNova Systems, Inc., Palo Alto, CA (US)

(72) Inventors: Raghu Prabhakar, San Jose, CA (US); Nathan Francis Sheeley, Austin, TX (US); Matheen Musaddiq, Austin, TX (US); Scott Layson Burson, Sunnyvale, CA (US); Sitanshu Gupta, San Jose, CA (US); Sumti Jairath, Santa Clara, CA (US); Pramod Nataraja, San Jose, CA (US); Ajit Punj, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,749

(22) Filed: Sep. 16, 2021

(65) Prior Publication Data

US 2022/0309029 A1 Sep. 29, 2022

Related U.S. Application Data

(63) Continuation of application No. 17/216,647, filed on Mar. 29, 2021, now Pat. No. 11,204,889.

(51) Int. Cl.
*G06F 15/78* (2006.01)
*G06F 15/80* (2006.01)
(Continued)

(52) U.S. Cl.
CPC ...... *G06F 15/7892* (2013.01); *G06F 15/7817* (2013.01); *G06F 15/7839* (2013.01);
(Continued)

(58) Field of Classification Search
CPC .................. G06F 15/8061; G06F 15/7892
See application file for complete search history.

(56) References Cited

U.S. PATENT DOCUMENTS

| | | |
|---|---|---|
| 4,204,636 A | 5/1980 | Hayman |
| 5,220,545 A | 6/1993 | Tomimitsu |

(Continued)

FOREIGN PATENT DOCUMENTS

WO 2010142987 A1 12/2010

OTHER PUBLICATIONS

Prabhakar et al., Plasticine: A Reconfigurable Architecture for Parallel Patterns, ISCA 2017, Jun. 24-28, 2017, Toronto, ON, Canada, 14 pages.

(Continued)

*Primary Examiner* — Shawn Doman
(74) *Attorney, Agent, or Firm* — Flagship Patents; Bruce Young; Sikander Khan

(57) ABSTRACT

A method of processing partitions of a tensor in a target order includes receiving, by a reorder unit and from two or more producer units, a plurality of partitions of a tensor in a first order that is different from the target order, storing the plurality of partitions in the reorder unit, and providing, from the reorder unit, the plurality of partitions in the target order to one or more consumer units. In an example, the one or more consumer units process the plurality of partitions in the target order.

20 Claims, 23 Drawing Sheets

(51) Int. Cl.
*G06F 17/16* (2006.01)
*G06F 15/76* (2006.01)

(52) U.S. Cl.
CPC .......... *G06F 15/8061* (2013.01); *G06F 17/16* (2013.01); *G06F 2015/763* (2013.01)

(56) References Cited

U.S. PATENT DOCUMENTS

| | | |
|---|---|---|
| 7,565,465 B2 | 7/2009 | Secatch |
| 10,831,507 B2 | 11/2020 | Shah et al. |
| 2004/0100963 A1 | 5/2004 | Guo |
| 2006/0190517 A1 | 8/2006 | Guerrero |
| 2007/0028076 A1 | 2/2007 | Wezelenburg |
| 2007/0177677 A1 | 8/2007 | Thomsen |
| 2009/0031089 A1 | 1/2009 | Tuominen |
| 2010/0313060 A1 | 12/2010 | Bjorklund et al. |
| 2014/0281417 A1 | 9/2014 | Peters |
| 2015/0039851 A1 | 2/2015 | Uliel et al. |
| 2016/0012012 A1 | 1/2016 | Yen et al. |
| 2016/0055004 A1 | 2/2016 | Grochowski et al. |
| 2017/0031865 A1 | 2/2017 | Eyole et al. |
| 2017/0083313 A1 | 3/2017 | Sankaralingam et al. |
| 2017/0123794 A1 | 5/2017 | Chen et al. |
| 2018/0173668 A1 | 6/2018 | Rusten |
| 2018/0324112 A1 | 11/2018 | Nicol |
| 2018/0341487 A1 | 11/2018 | Kim et al. |
| 2019/0042241 A1 | 2/2019 | Akin |
| 2019/0130270 A1 | 5/2019 | Nicol et al. |
| 2019/0286973 A1 | 9/2019 | Kovvuri et al. |
| 2019/0324888 A1 | 10/2019 | Evans et al. |
| 2019/0385046 A1 | 12/2019 | Cassidy et al. |
| 2019/0391811 A1 | 12/2019 | Garegrat et al. |
| 2020/0020156 A1 | 1/2020 | Howson |
| 2020/0042856 A1 | 2/2020 | Datta et al. |
| 2020/0097289 A1 | 3/2020 | Eapen et al. |
| 2020/0159692 A1 | 5/2020 | Shah et al. |
| 2020/0211262 A1 | 7/2020 | Vaidyanathan et al. |
| 2020/0302305 A1 | 9/2020 | Oki et al. |
| 2020/0349420 A1 | 11/2020 | Ovsiannikov et al. |
| 2020/0410327 A1 | 12/2020 | Chinya et al. |
| 2021/0011785 A1 | 1/2021 | Sanghi et al. |

OTHER PUBLICATIONS

Koeplinger et al., Spatial: A Language and Compiler for Application Accelerators, Proceedings of the 39th ACM Sigplan Conference on Programming Language Design And Embodiment (PLDI), Proceedings of the 43rd International Symposium on Computer Architecture, 2018.

U.S. Appl. No. 17/216,650—Office Action dated Jun. 30, 2021, 15 pages.

U.S. Appl. No. 17/216,650—Office Action dated Aug. 18, 2021, 25 pages.

Podobas et al., A Survey on Coarse-Grained Reconfigurable Architectures From a Performance Perspective, IEEEAccess, vol. 2020. 3012084, Jul. 27, 2020, 25 pages.

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

U.S. Appl. No. 17/216,650 Response to Office Action dated Jun. 30, 2021, filed Jul. 29, 2021, 17 pages.

U.S. Appl. No. 17/216,650 Response to Office Action dated Aug. 18, 2021, filed Sep. 9, 2021, 13 pages.

U.S. Appl. No. 17/216,650 Notice of Allowance, dated Feb. 16, 2022, 11 pages.

Target partition access order: partitions 1106a, 1106c, 1106e, 1106g, 1106b, 1106d, 1106f, 1106h

| Sequence ID → | 1107_a_1 | 1107_a_2 | 1107_a_3 | 1107_a_4 | 1107_b_1 | 1107_b_2 | 1107_b_3 | 1107_b_4 |
|---|---|---|---|---|---|---|---|---|
| Partition → | 1106a | 1106c | 1106e | 1106g | 1106b | 1106d | 1106f | 1106h |
| Memory unit in which partition is stored → | 1102a | 1102a | 1102b | 1102b | 1102a | 1102a | 1102b | 1102b |

First cycle 1109a of sequence IDs | Reset signal 1111 → | Second cycle 1109b of sequence IDs

FIG. 11B

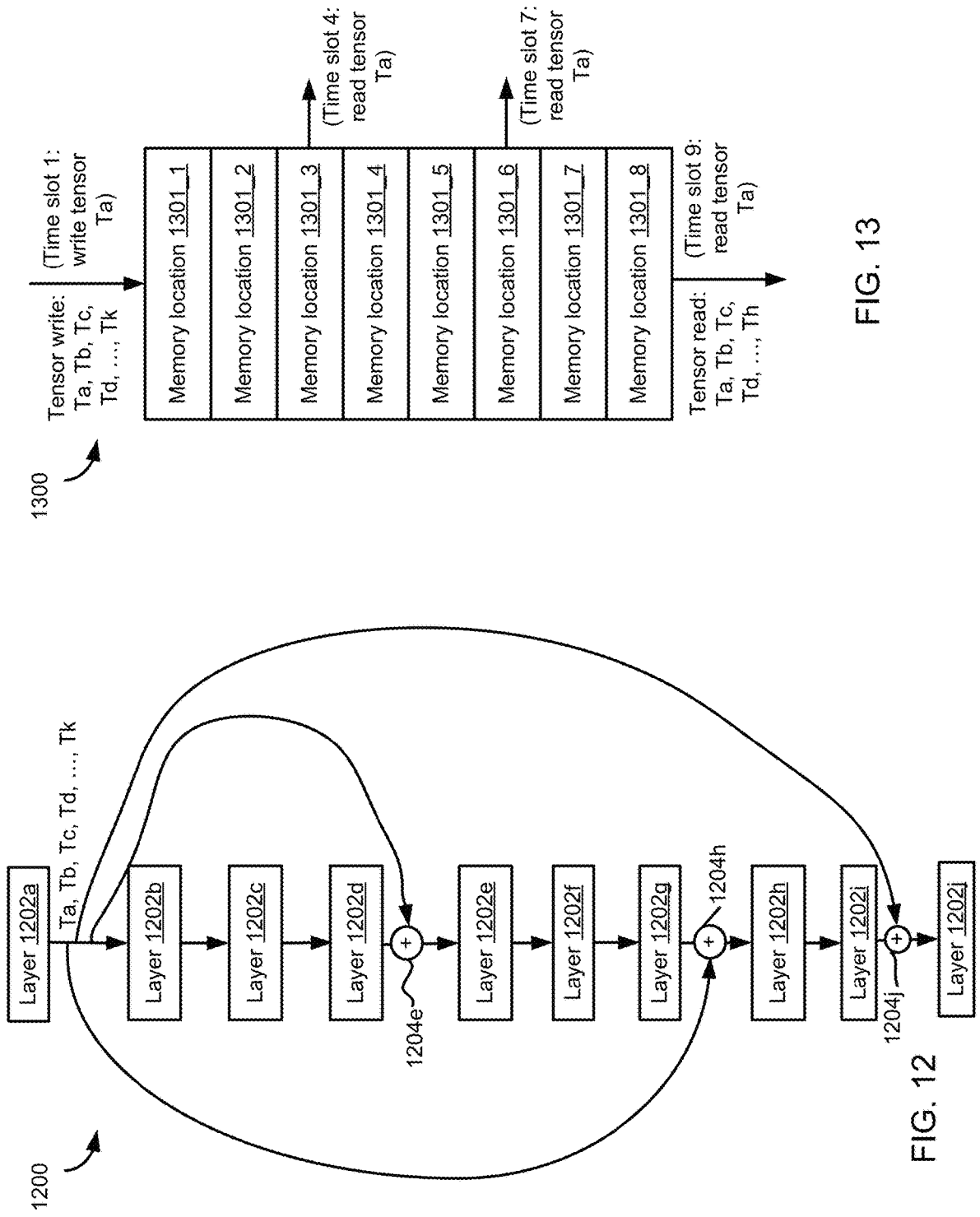

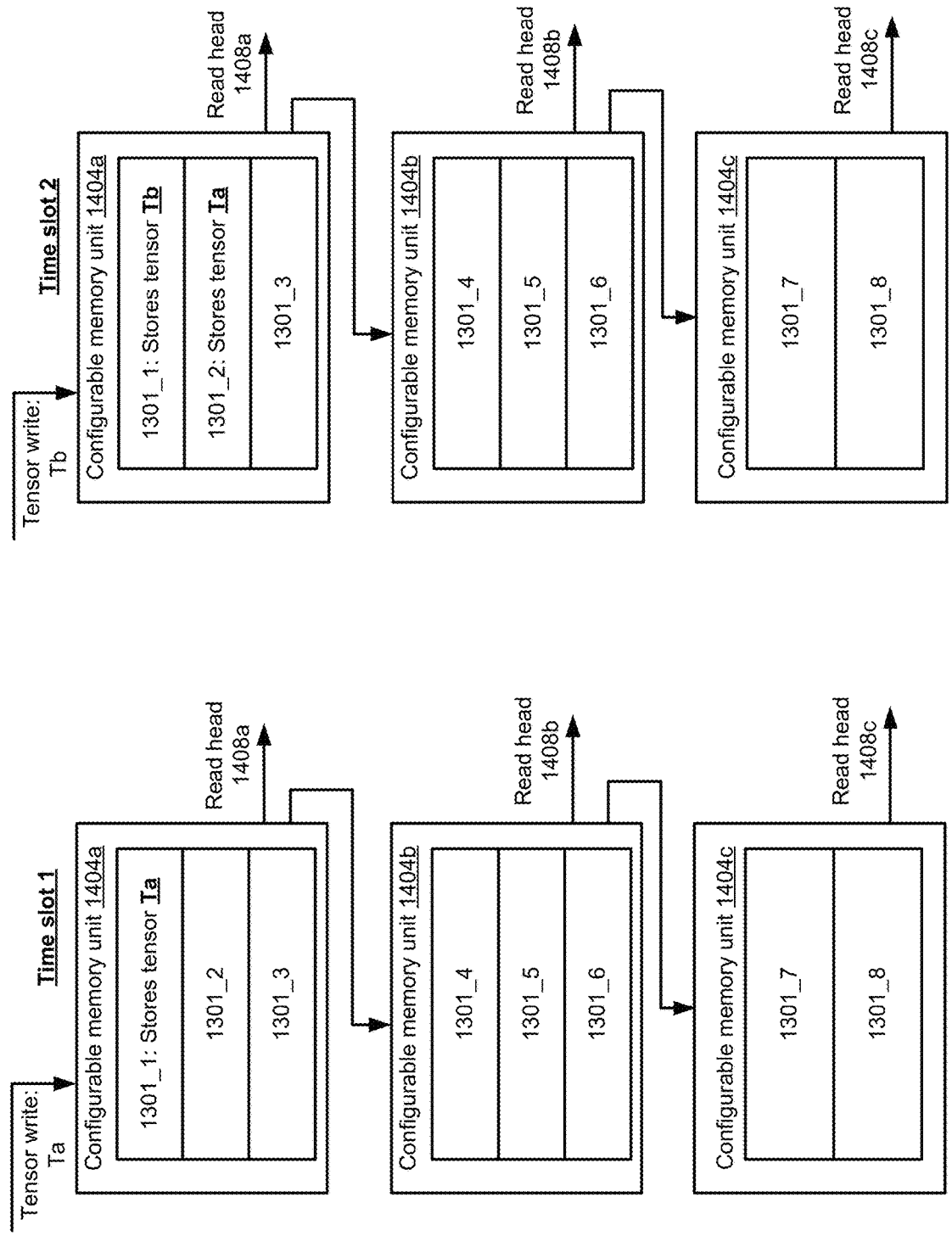

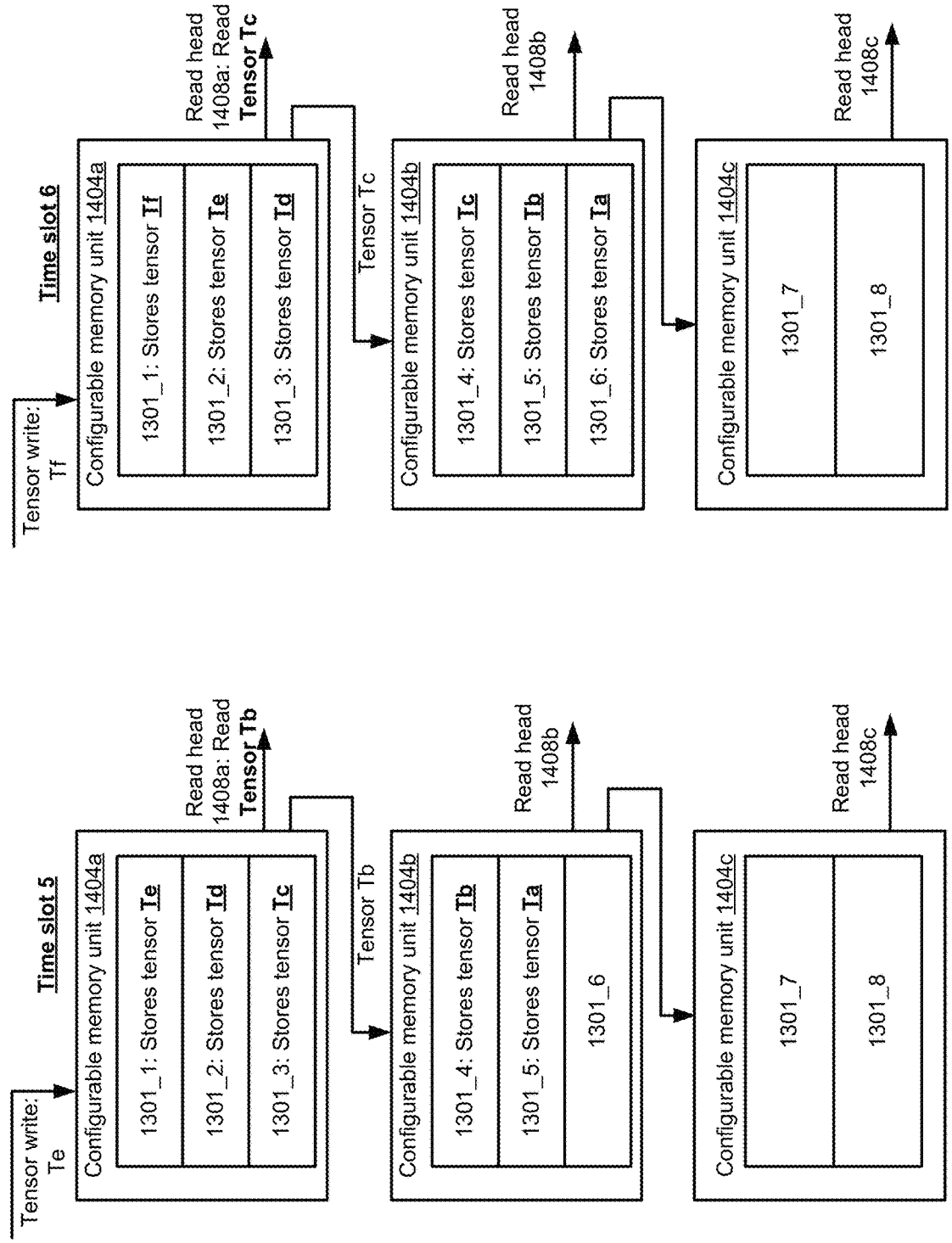

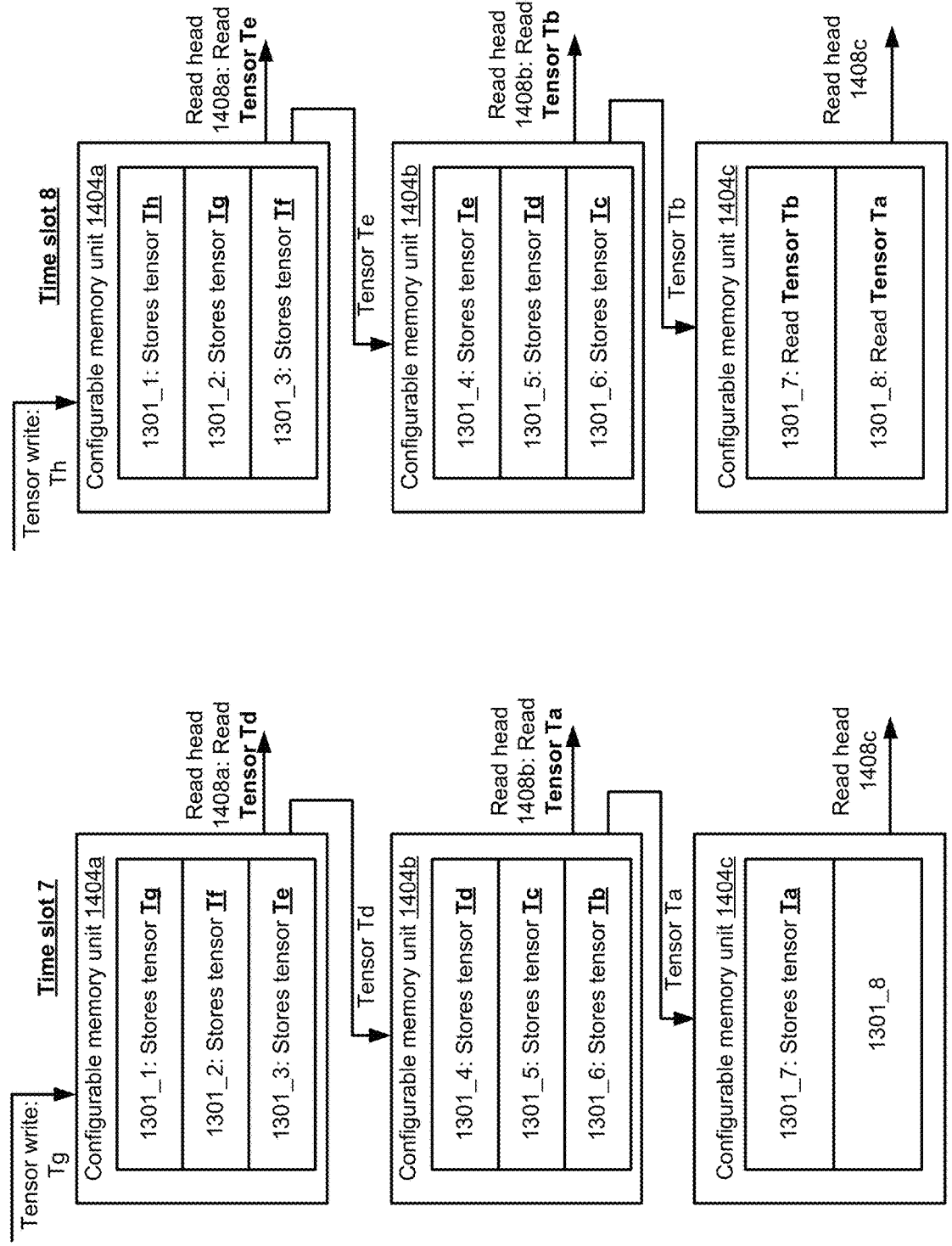

TENSOR PARTITIONING AND PARTITION ACCESS ORDER

PRIORITY APPLICATION

This application is a continuation of U.S. Non-provisional patent application Ser. No. 17/216,647, filed Mar. 29, 2021, entitled, "TENSOR PARTITIONING AND PARTITION ACCESS ORDER,". The Non-provisional application is incorporated by reference for all purposes as if fully set forth herein

FIELD OF THE TECHNOLOGY DISCLOSED

The present technology relates to reconfigurable architectures, and can be particularly applied to time-multiplexed use of reconfigurable hardware.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The* 39*th ACM SIGPLAN Conference On Programming Language Design And Implementation* (PLDI), Proceedings of the 43rd International Symposium on Computer Architecture, 2018;

U.S. Non-provisional patent application Ser. No. 16/239, 252, filed Jan. 3, 2019, entitled, "VIRTUALIZATION OF A RECONFIGURABLE DATA PROCESSOR,", which is now issued as U.S. Pat. No. 10,698,853 issued on Jun. 30, 2020;

U.S. Non-provisional patent application Ser. No. 16/197, 826, filed Nov. 21, 2018, entitled, "CONFIGURATION LOAD OF A RECONFIGURABLE DATA PROCESSOR,", which is now issued as U.S. Pat. No. 10,831,507 issued on Nov. 10, 2020;

U.S. Non-provisional patent application Ser. No. 16/198, 086, filed Nov. 21, 2018, entitled, "CONFIGURATION UNLOAD OF A RECONFIGURABLE DATA PROCESSOR,";

U.S. Non-provisional patent application Ser. No. 16/260, 548, filed Jan. 29, 2019, entitled, "MATRIX NORMAL/TRANSPOSE READ AND A RECONFIGURABLE DATA PROCESSOR INCLUDING SAME,", which is now issued as U.S. Pat. No. 10,768,899 issued on Sep. 8, 2020;

U.S. Non-provisional patent application Ser. No. 16/536, 192, filed Aug. 8, 2019, entitled, "COMPILER FLOW LOGIC FOR RECONFIGURABLE ARCHITECTURES,";

U.S. Non-provisional patent application Ser. No. 16/407, 675, filed May 9, 2019, entitled, "CONTROL FLOW BARRIER AND RECONFIGURABLE DATA PROCESSOR,";

U.S. Non-provisional patent application Ser. No. 16/504, 627, filed Jul. 8, 2019, entitled, "QUIESCE RECONFIGURABLE DATA PROCESSOR,";

U.S. Non-provisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION,";

U.S. Non-provisional patent application Ser. No. 16/744, 077, filed Jan. 15, 2020, entitled, "COMPUTATIONALLY EFFICIENT SOFTMAX LOSS GRADIENT BACKPROPAGATION,";

U.S. Non-provisional patent application Ser. No. 16/590, 058, filed Oct. 1, 2019, entitled, "COMPUTATION UNITS FOR FUNCTIONS BASED ON LOOKUP TABLES,";

U.S. Non-provisional patent application Ser. No. 16/695, 138, filed Nov. 25, 2019, entitled, "COMPUTATIONAL UNITS FOR BATCH NORMALIZATION,";

U.S. Non-provisional patent application Ser. No. 16/688, 069, filed Nov. 19, 2019, entitled, "LOOK-UP TABLE WITH INPUT OFFSETTING,";

U.S. Non-provisional patent application Ser. No. 16/718, 094, filed Dec. 17, 2019, entitled, "COMPUTATIONAL UNITS FOR ELEMENT APPROXIMATION,";

U.S. Non-provisional patent application Ser. No. 16/560, 057, filed Sep. 4, 2019, entitled, "SIGMOID FUNCTION IN HARDWARE AND A RECONFIGURABLE DATA PROCESSOR INCLUDING SAME,";

U.S. Non-provisional patent application Ser. No. 16/572, 527, filed Sep. 16, 2019, entitled, "PERFORMANCE ESTIMATION-BASED RESOURCE ALLOCATION FOR RECONFIGURABLE ARCHITECTURES,";

U.S. Non-provisional patent application Ser. No. 15/930, 381, filed May 12, 2020, entitled, "COMPUTATIONALLY EFFICIENT GENERAL MATRIX-MATRIX MULTIPLICATION (GeMM),";

U.S. Non-provisional patent application Ser. No. 16/890, 841, filed Jun. 2, 2020, entitled, "ANTI-CONGESTION FLOW CONTROL FOR RECONFIGURABLE PROCESSORS,";

U.S. Non-provisional patent application Ser. No. 16/922, 975, filed Jul. 7, 2020, entitled, "RUNTIME VIRTUALIZATION OF RECONFIGURABLE DATA FLOW RESOURCES,";

U.S. Non-provisional patent application Ser. No. 16/996, 666, filed Aug. 18, 2020, entitled, "RUNTIME PATCHING OF CONFIGURATION FILES,";

U.S. Non-provisional patent application Ser. No. 17/023, 015, filed Sep. 16, 2020, "COMPILE TIME LOGIC FOR DETECTING STREAMING COMPATIBLE AND BROADCAST COMPATIBLE DATA ACCESS PATTERNS"; and U.S. Non-provisional patent application Ser. No. 17/031, 679, filed Sep. 24, 2020, "SYSTEMS AND METHODS FOR MEMORY LAYOUT DETERMINATION AND CONFLICT RESOLUTION".

BACKGROUND

Reconfigurable processors can be configured to implement a variety of functions more efficiently or faster than might be achieved using a general-purpose processor executing a computer program. So called Coarse-Grain Reconfigurable Architectures (e.g., CGRAs) are being developed in which the configurable units in the array are more complex than those used in typical, more fine-grained Field-Programmable Gate Arrays (FPGAs), and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

A reconfigurable architecture system may include general-purpose non-reconfigurable hardware, as well as reconfigurable hardware resources that can be reconfigured to suit a need of a specific application being executed in the reconfigurable hardware. In an example, certain portions of an application program are executed in the general-purpose hardware, and other portions of the application program are executed in the reconfigurable hardware. When portions of an application are being executed in the general-purpose hardware, the reconfigurable hardware can be idle. Similarly, when other portions of the application are being executed in the reconfigurable hardware, the general-purpose hardware can be idle. This may result in underutilization of hardware resources in the reconfigurable architecture system.

In order to maximize operating efficiency, it may be desirable to time-multiplex programs on the reconfigurable architecture system.

BRIEF DESCRIPTION OF THE DRAWINGS

FIG. 11B illustrates individual partitions being assigned corresponding IDs, to implement a correct order of partition access, where there are multiple cycles of the sequence IDs, and where a total number of sequence IDs in each cycle is based on a storage capacity of a configurable reorder memory unit of the system of FIG. 11A.

FIG. 12 illustrates an example neural network topology that employs skip connections.

FIG. 13 illustrates a logical view of a multi-head multi-buffer arrangement.

FIGS. 15A-15I illustrate operations of the system of FIG. 14 comprising three configurable memory units implementing the multi-head multi-buffer arrangement.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Elements referred to herein with a common reference label followed by a particular number or alphabet may be collectively referred to by the reference label alone. For example, partitions 706a, 706b, . . . , 706h (illustrated in FIG. 7) may be collectively and generally referred to as partitions 706 in plural, and partition 706 in singular.

Figure 1:
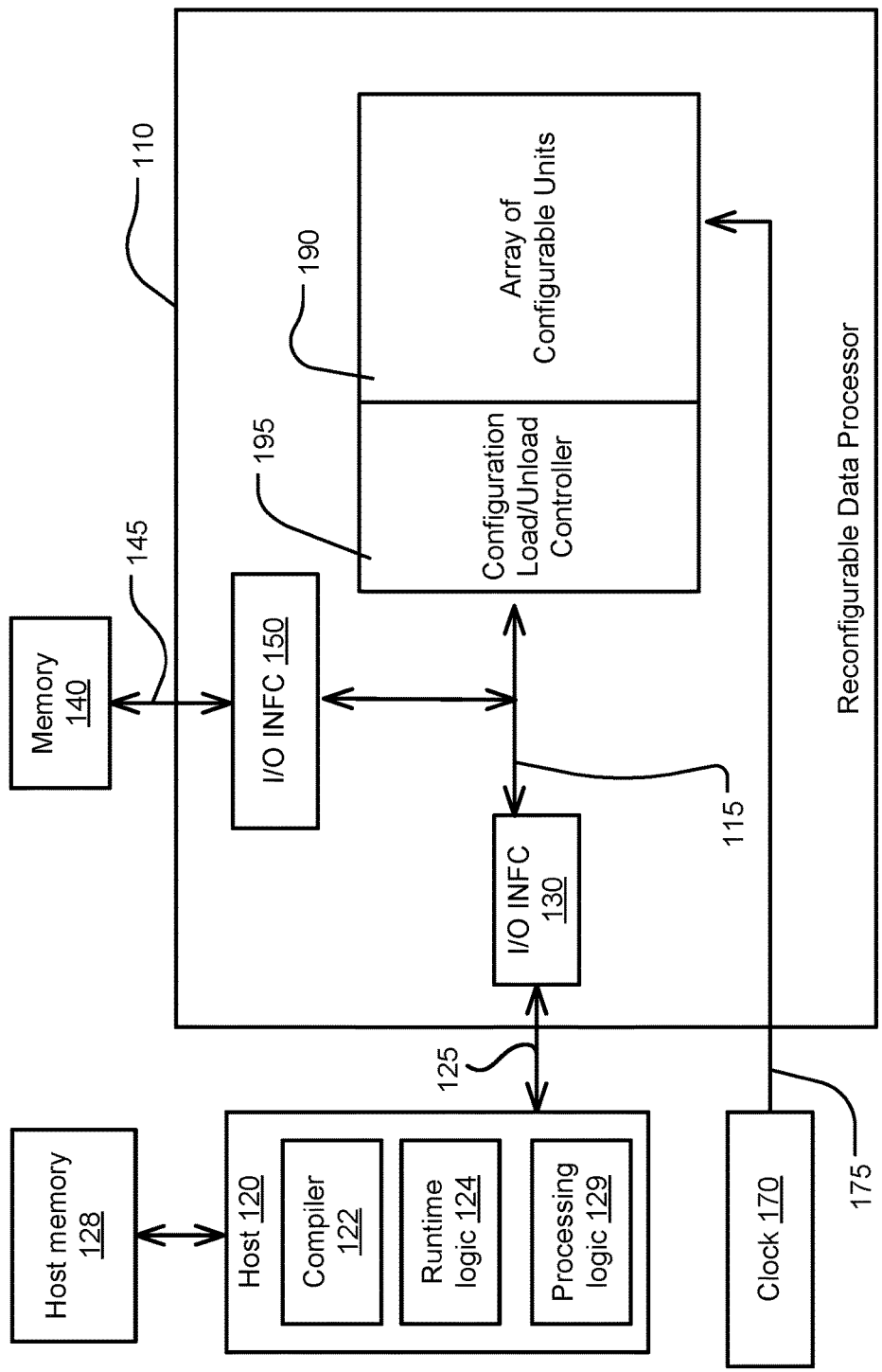
FIG. 1 is a system diagram illustrating a system including a host, a memory, and a reconfigurable data processor.

FIG. 1 is a system diagram illustrating a system including a host 120, a memory 140, and a reconfigurable data processor 110. In an example, the host 120, unlike the reconfigurable data processor 110, cannot be reconfigured based on the application program being executed on the host 120. Accordingly, the host 120 is also referred to as non-reconfigurable general-purpose hardware, or simply general hardware. Thus, the term "general hardware" implies that such hardware resources are not configurable to suit the needs of a program being executed thereon.

In contrast, the reconfigurable data processor 110 and one or more reconfigurable components therewithin (e.g., an array of configurable units 190) are referred to as "reconfigurable hardware", as the reconfigurable data processor 110 and the one or more components therewithin are configurable and reconfigurable to suit needs of a program being executed thereon, as will be discussed herein in further detail in turn.

As shown in the example of FIG. 1, the host 120 executes a compiler 122 to compile applications, and a runtime logic 124 to execute the compiled applications on the reconfigurable data processor 110. For example, the compiler 122 compiles a high-level application and generates one or more corresponding execution files, where the execution files include configuration files or bit files (the terms configuration file and bit file are used interchangeably). The runtime logic 124 is configured to load and execute the one or more configuration files on the reconfigurable data processor 110.

The reconfigurable data processor 110 is configured to process the configuration files and generate corresponding outputs.

As shown in the example of FIG. 1, the reconfigurable data processor 110 includes the array of configurable units 190 and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

The reconfigurable data processor 110 includes an external I/O interface 130 connected to the host 120 via a bus system 125, and external I/O interface 150 connected to the memory 140 via a bus system 145. The I/O interfaces 130, 150 connect via a bus system 115 to the array of configurable units 190 and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array of configurable units 190 with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the reconfigurable data processor 110. The configuration file can be retrieved from the memory 140 via the memory interface 150. Chunks of the configuration file can then be sent in a distribution sequence as described herein to configurable units in the array of configurable units 190 in the reconfigurable data processor 110.

The host 120 also executes processing logic 129, which performs operations when executing an application. For example, assume that an application to be executed in the system 100 has to pre-process data by the host 120, prior to the data being processed by the reconfigurable data processor 110. In an embodiment, the processing logic 129 within the host 120 preprocesses the data of the application.

In an example, the memory 140 is within a chip that is different from a chip comprising the reconfigurable data processor 110, and hence, the memory 140 is referred to herein as an off-chip memory. Similarly, the memory 128 is within a chip that is different from a chip comprising the reconfigurable data processor 110, and hence, the memory 128 is also referred to herein as an off-chip memory. Thus, off-chip memory refers to the memory 140 and/or the memory 128, in some examples. In contrast, the reconfigurable array of units 190 comprises configurable memory units (such as PMUs illustrated in FIGS. 3 and 5), which are referred to herein as on-chip memory.

An external clock generator 170 or other clock signal sources can provide a clock signal 175 or clock signals to elements in the reconfigurable data processor 110, including the array of configurable units 190, and the bus system 115, and the external data I/O interfaces.

Figure 2:
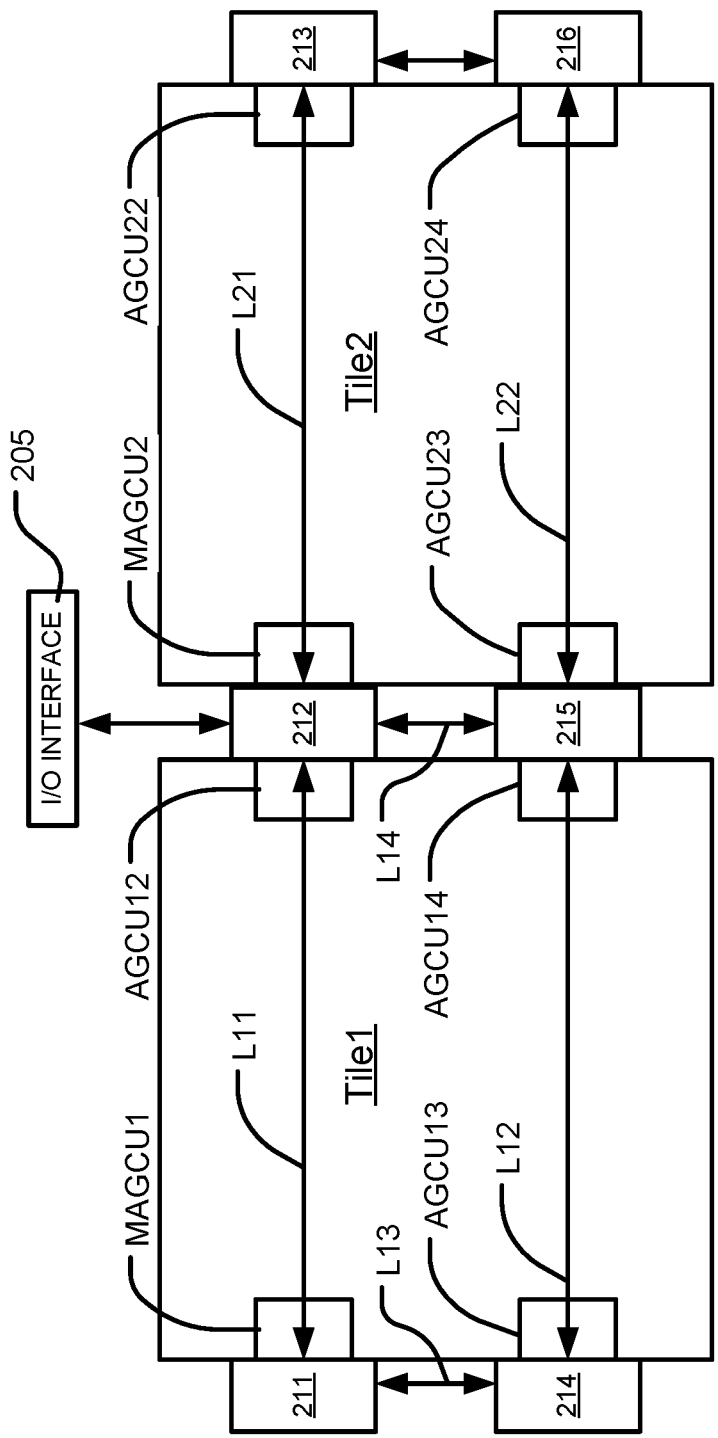
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including an array level network in this example. The bus system includes a top level network connecting the tiles to external I/O interface 205 (or any number of interfaces). In other embodiments, different bus system configurations may be utilized. The configurable units in each tile are nodes on the array level network in this embodiment.

Each of the four tiles has 4 AGCUs (Address Generation and Coalescing Units) (e.g., MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/O interfaces, including I/O interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU (MAGCU), which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (211-216) connecting to each other as well as to other nodes on the top level network, including the AGCUs, and I/O interface 205. The top level network includes links (e.g., L11, L12, L21, L22) connecting the top level switches. Data travel in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, top level switches 212 and 215 are connected by a link L14, and top level switches 212 and 213 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 211, 212, 214 and 215 are connected to MAGCU1, AGCU12, AGCU13 and AGCU14 in the tile Tile1, respectively. Top level switches 212, 213, 215 and 216 are connected to MAGCU2, AGCU22, AGCU23 and AGCU24 in the tile Tile2, respectively.

Top level switches can be connected to one or more external I/O interfaces (e.g., interface 205).

Figure 3A:
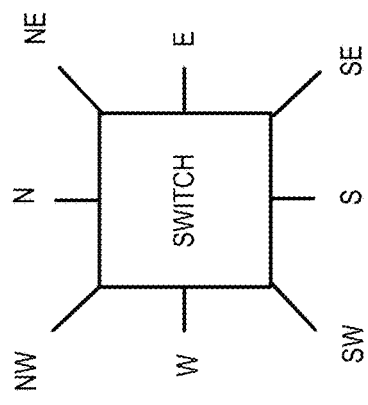
FIG. 3A illustrates an example switch unit connecting elements in an array level network.
Figure 3:
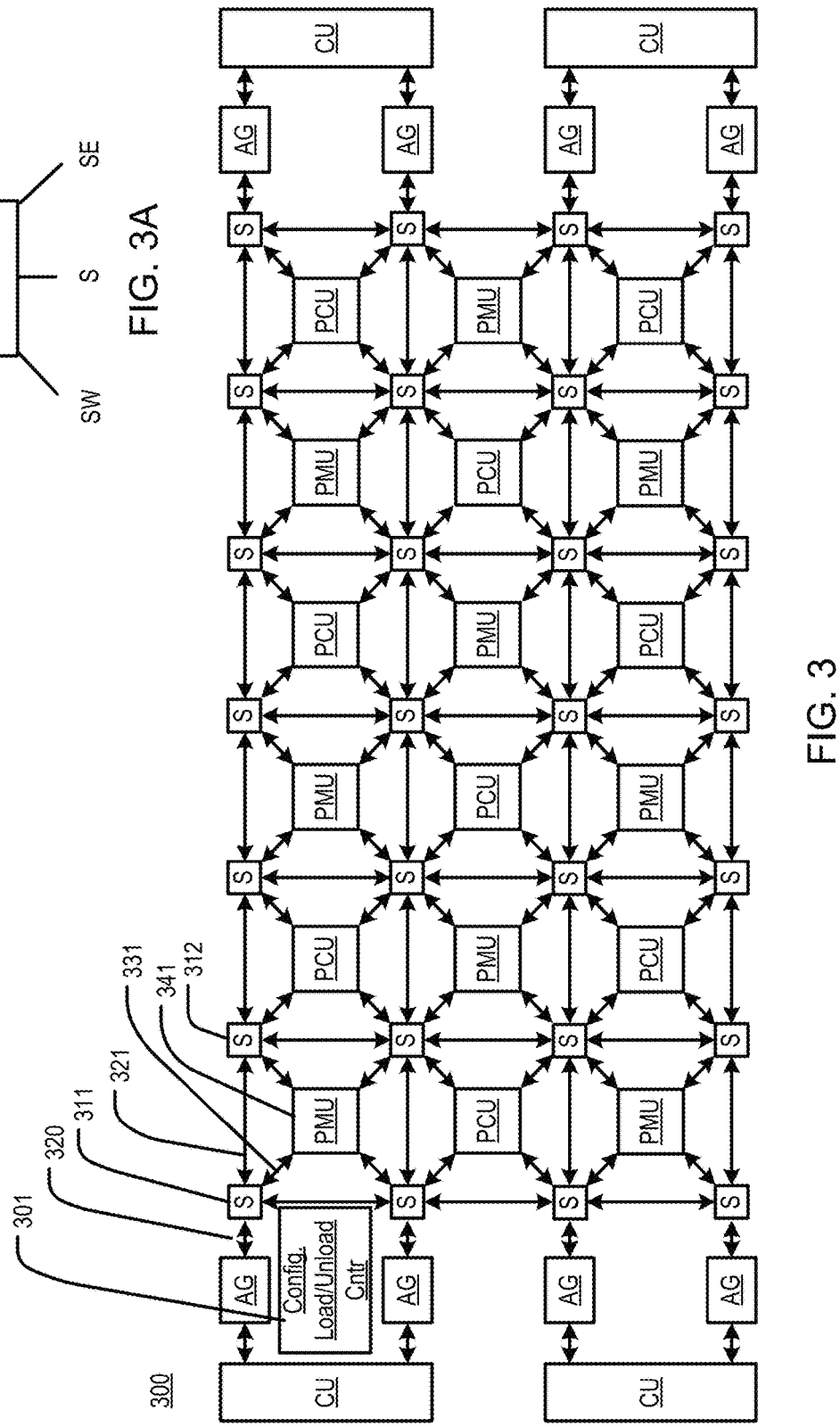
FIG. 3 is a simplified diagram of a tile and an array level network usable in the configuration of FIG. 2, where the configurable units in the array are nodes on the array level network.

FIG. 3 is a simplified diagram of a tile and an array level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g., 128 bits of data), a word-level scalar bus (e.g., 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicates if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in the most significant bit first order of Chunk 5−>Chunk 4−>Chunk 3−>Chunk 2−>Chunk 1−>Chunk 0. (Note that this most significant bit first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first. Further detail of the load and unload process can be found in U.S. Non-provisional patent application Ser. No. 16/197,826, filed Nov. 21, 2018, entitled, "CONFIGURATION LOAD OF A RECONFIGURABLE DATA PROCESSOR,", which is now issued as U.S. Pat. No. 10,831,507 issued on Nov. 10, 2020; and in U.S. Non-provisional patent application Ser. No. 16/198,086, filed Nov. 21, 2018, entitled, "CONFIGURATION UNLOAD OF A RECONFIGURABLE DATA PROCESSOR,", each of which are incorporated by reference for all purposes as if fully set forth herein.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances.

In an example, the switch unit is configurable. For example, when a first configuration file is being executed, the switch unit can interconnect a first PCU with a first PMU (e.g., such that the first PCU stores data in the first PMU). On the other hand, when a second configuration file is being executed, the same switch unit can interconnect the first PCU with a second PMU (e.g., such that the first PCU stores data in the second PMU).

A set of 2 switch units in each tile quadrant have connections to an Address Generation and Coalescing Unit (AGCU) that include multiple Address Generation (AG) units and a Coalescing Unit (CU) connected to the multiple address generation units. The Coalescing Unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 312, and a link 331 between the Southeast (SE) vector interface of the switch unit 311 and the PMU 341.

Figure 4:
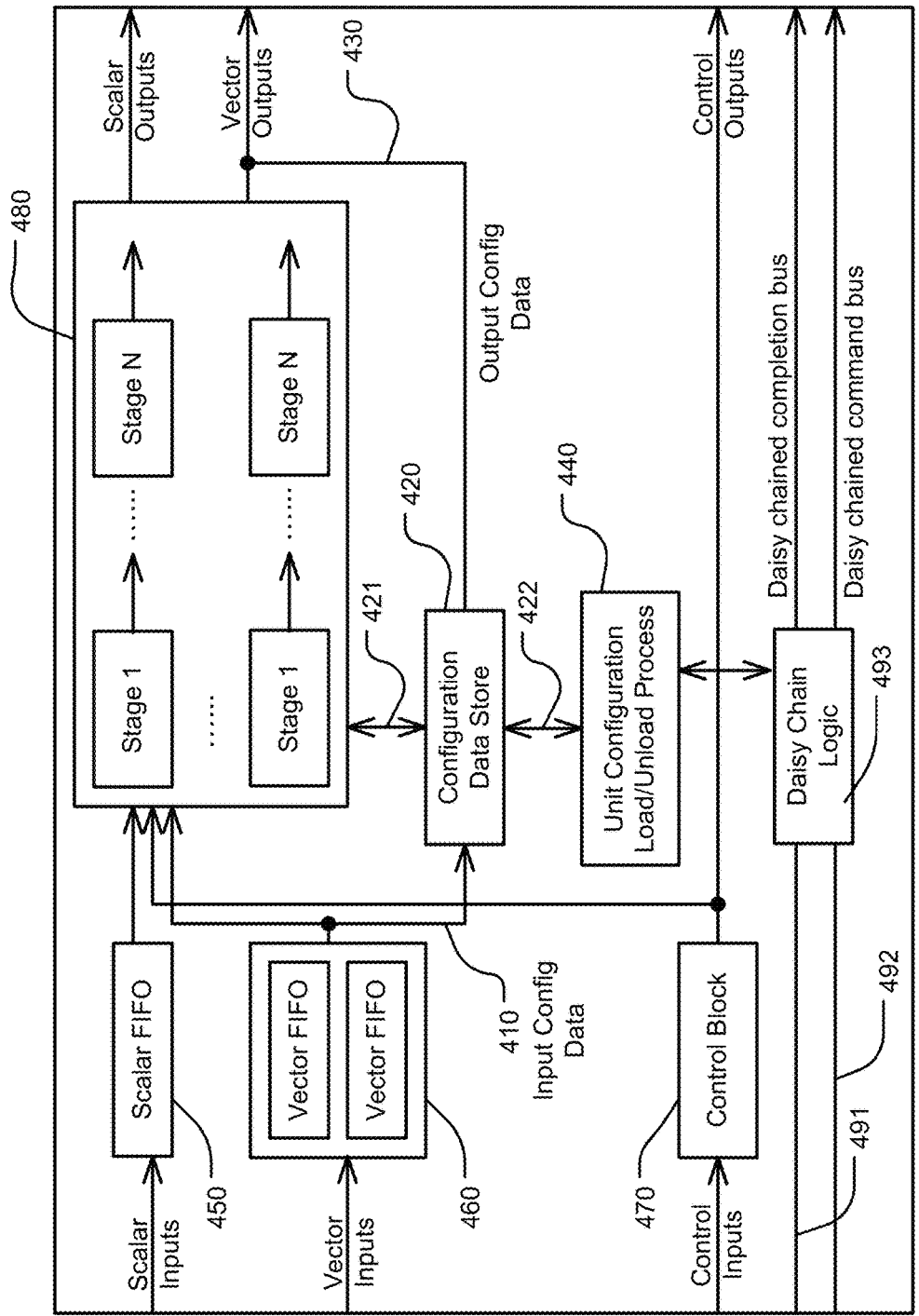
FIG. 4 is a block diagram illustrating an example configurable unit, such as a Pattern Compute Unit (PCU).

In this example, one of the AGCUs is configured to be a master AGCU, which includes a configuration load/unload controller (e.g., 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU), which is configured based on configuration files corresponding to one or more applications. For example, a first configuration file corresponding to a first application can configure the PCU 400 in a first configuration when the first configuration file is being executed by the reconfigurable data processor 110, and a second configuration file corresponding to a second application can configure the PCU 400 in a second configuration when the second configuration file is being executed by the reconfigurable data processor 110, where the first and second configurations are different.

Configurable units in the array of configurable units include configuration data stores 420 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving via the bus system (e.g., the vector inputs), chunks of a unit file particular to the configurable unit, and loading the received chunks into the configuration data store 420 of the configurable unit.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (TO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy chained completion bus to indicate when a load/unload command has been completed. The master AGCU transmits the program load and unload commands to configurable units in the array of configurable units over a daisy-chained command bus. As shown in the example of FIG. 4, a daisy chained completion bus 491 and a daisy chained command bus 492 are connected to daisy chain logic 493, which communicates with the unit configuration load logic 440. The daisy chain logic 493 can include load complete status logic, as described below. The daisy chained completion bus is further described below. Other topologies for the command and completion buses are clearly possible but not described here.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. Physical configuration of various stages and components of the SIMD is based on the configuration files loaded in the PCU, and they are reconfigurable based on the configuration files. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

A Pattern Memory Unit (PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU.

Figure 5:
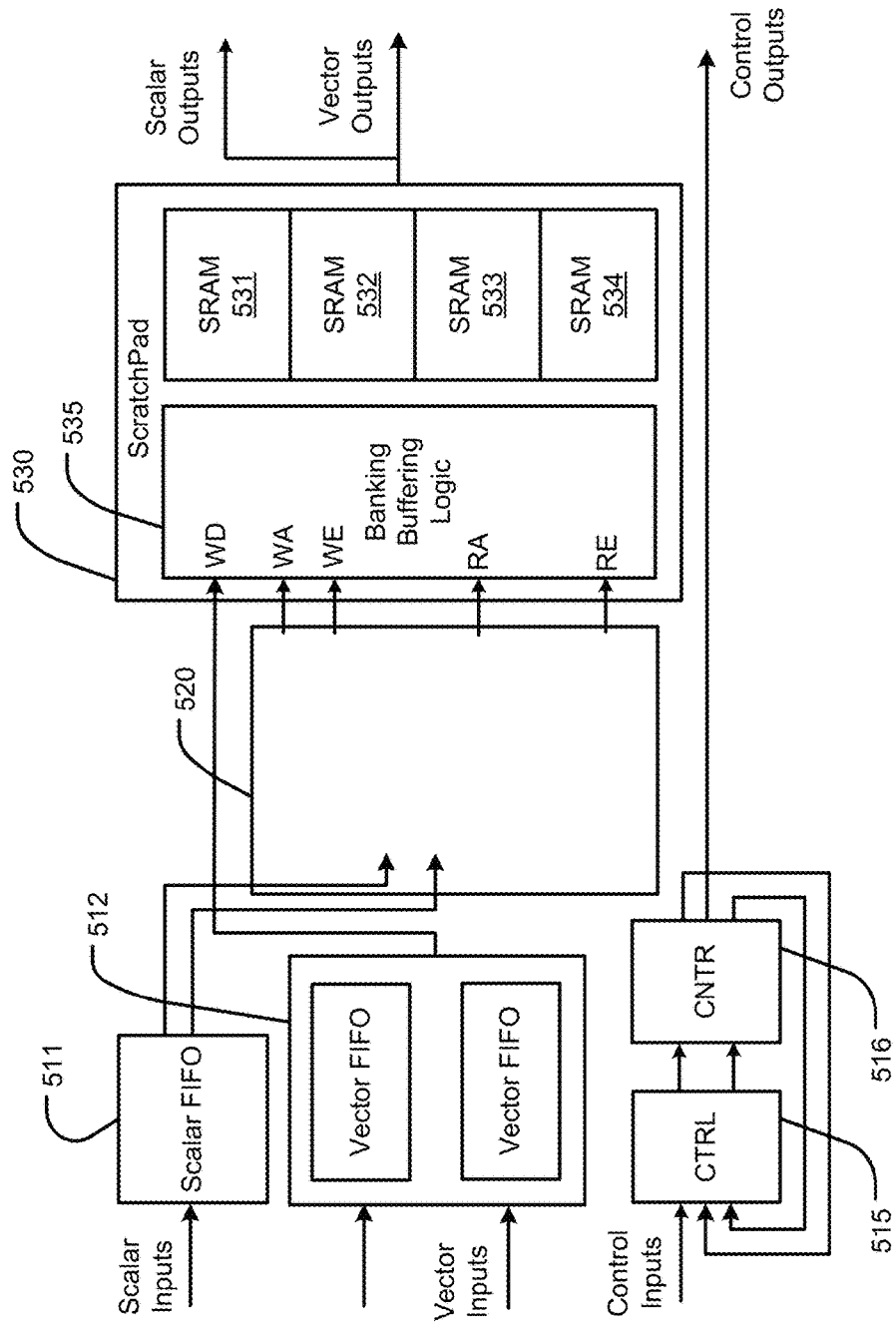
FIG. 5 is a block diagram illustrating an example configurable unit, such as a Pattern Memory Unit (PMU).

FIG. 5 is a block diagram illustrating an example configurable unit 500, such as a Pattern Memory Unit (PMU), which is configured based on configuration files corresponding to one or more applications. For example, a first configuration file corresponding to a first application can configure the PMU 500 in a first configuration when the first configuration file is being executed by the reconfigurable data processor 110, and a second configuration file corresponding to a second application can configure the PMU 500 in a second configuration when the second configuration file is being executed by the reconfigurable data processor 110, where the first and second configurations are different.

A PMU can contain scratchpad memory 530 coupled with a reconfigurable scalar data path 520 intended for address calculation (RA, WA) and control (WE, RE) of the scratchpad memory 530, along with the bus interfaces used in the PCU 400.

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a Look-Up Table stored in the scratchpad memory 530, from a configuration file or from other sources. In a computation unit as described herein, the scalar data path 520 can translate a section of a raw input value I for addressing Look-Up Tables implementing a function f(I), into the addressing format utilized by the SRAM scratchpad memory 530, adding appropriate offsets and so on, to read the entries of the Look-Up Table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 512 and external control inputs, the control block 515 can be configured to trigger the write address computation, read address computation, or both, by enabling the appropriate counters 516. A programmable counter chain 516 (Control Inputs, Control Outputs) and control block 515 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Tensor Partitioning

Figure 6:
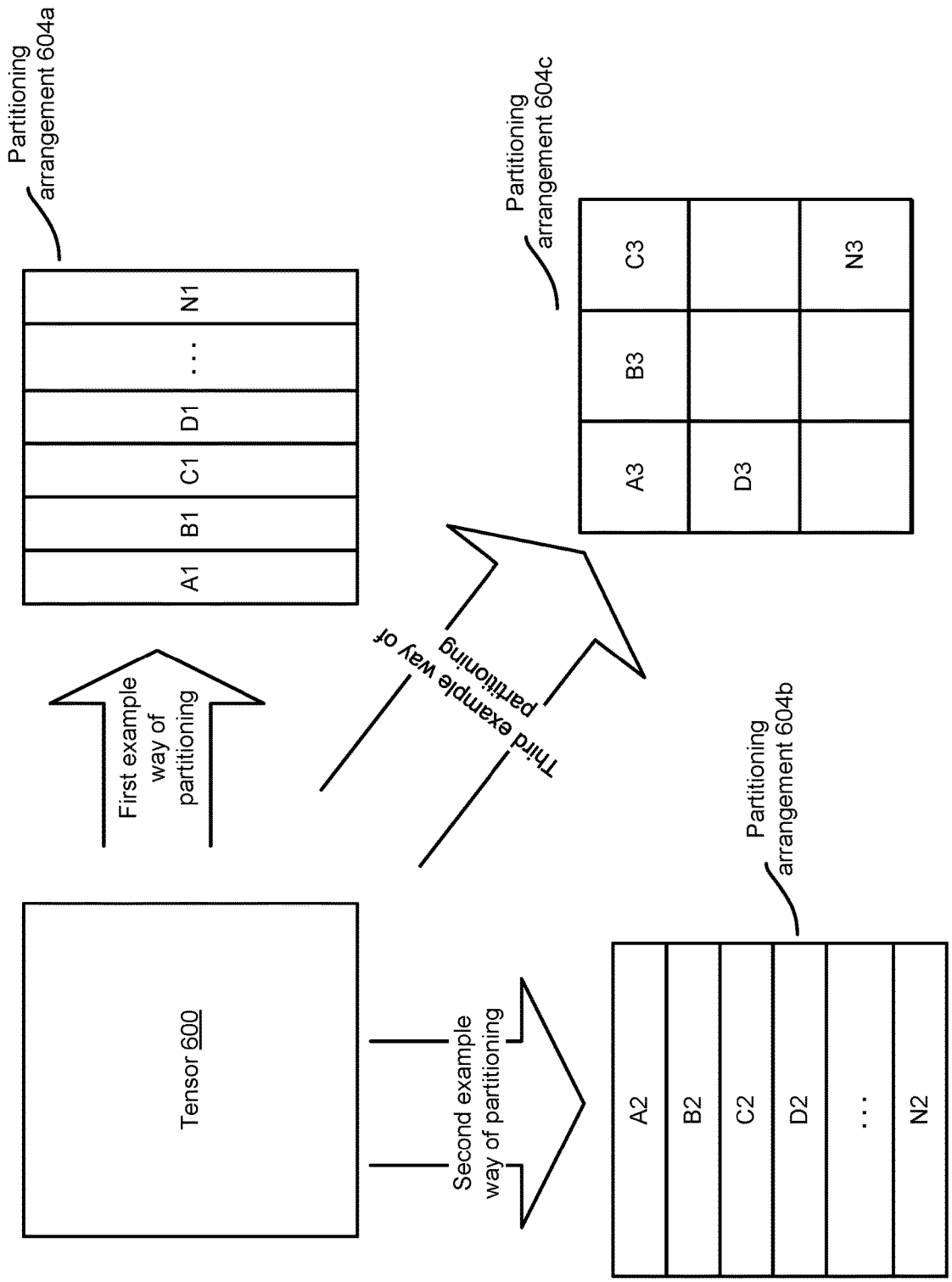
FIG. 6 illustrates example partitioning arrangements of a logical tensor.

FIG. 6 illustrates example partitioning arrangements of a logical tensor 600. The tensor 600 can be an input tensor to a neural network, or a tensor that is generated by a specific layer (such as an intermediate layer) or function of the neural network. The tensor 600 can comprise appropriate data to be processed by the neural network, such as image data, audio data, natural language processing (NLP) data, and/or the like. In an example, the tensor 600 can be a two-dimensional tensor, such as a matrix of an appropriate size. In another example, the tensor 600 can be of higher dimensions, such as three or higher dimensions, e.g., corresponding to various channels of data. The size and/or dimensionality of the tensor 600 is implementation specific.

In an example, the tensor 600 is relatively large in size, e.g., too large to be stored and/or processed in a single configurable unit. For example, the tensor 600 may be too large to be stored in a single PMU of FIG. 3, and/or may be too large to be processed by a single PCU of FIG. 3. In another example, even if the tensor 600 can be processed by a single PCU, processing the tensor 600 in a single PCU may be time-consuming and/or result in underutilization of other PCUs. Accordingly, in some examples, the tensor 600 is partitioned into two or more partitions, and the partitions can be stored in different PMUs and/or processed by different PCUs, as will be discussed herein in further detail. A partition is also referred to as a subtensor, and a tensor comprises multiple such subtensors.

FIG. 6 illustrates three example manners in which the tensor 600 can be partitioned. A first example way of partitioning the tensor 600 involves partitioning the tensor 600 into groups comprising one or more corresponding column vectors of the tensor. For example, in a first partitioning arrangement 604a, the tensor 600 is partitioned in partitions A1, B1, N1, where each partition comprises one or more corresponding column vectors of the tensor 600.

In FIG. 6, a second example way of partitioning the tensor 600 involves partitioning the tensor 600 into groups comprising one or more corresponding row vectors of the tensor 600. For example, in a second partitioning arrangement 604b, the tensor 600 is partitioned in partitions A2, B2, . . . , N2, where each partition comprises one or more corresponding row vectors of the tensor 600.

In FIG. 6, a third example way of partitioning the tensor 600 involves partitioning the tensor 600 into multiple tiles. For example, in a third partitioning arrangement 604c, the tensor 600 is partitioned in tiles A3, B3, . . . , N3. Individual tiles comprise a corresponding matrix, such that the tiles in combination form the tensor 600.

Thus, FIG. 6 illustrates three example ways in which the tensor 600 can be partitioned, without limiting the scope of this disclosure, and the tensor 600 can be partitioned in any other appropriate manner as well. Merely example, the tensor 600 may comprise data from multiple channels, and individual partitions can include data from corresponding data channels.

In an embodiment, a number of partitions of a tensor can be based on a number of factors, such as capacity of the configurable units in the array of configurable units 190 (see FIGS. 1 and 3), bandwidth of the configurable units in the array of configurable units 190, and/or the like. Merely as an example, if the tensor 600 is 2 Megabytes (MB) and individual configurable units of FIGS. 1 and 3 can store and/or efficiently process 0.5 MB, then the tensor 600 has to be partitioned into at least 4 partitions or more. Thus, in an example, a capacity of the configurable units dictates a minimum number of partitions in which the tensor 600 is to be partitioned.

In another example, the partitioning of the tensor 600 can also be based on a bandwidth of the configurable units. For example, continuing with the above example use case where the tensor 600 is 2 MB and capacity of individual configurable units is 0.5 MB, assume there are 8 configurable units (e.g., 8 PCUs) available to process the tensor 600. Thus, in this example, the tensor 600 may be partitioned in 8 different partitions, based on bandwidth of 8 PCUs available to process the tensor 600.

Thus, the tensor 600 is partitioned into multiple partitions, e.g., for storing the tensor 600 in two or more PMUs (e.g., when a single PMU may not have sufficient memory for storing the entire tensor 600) and/or to accelerate processing of the tensor 600 using two or more PCUs (e.g., when a single PCU may not have sufficient capacity to efficiently process the entire tensor 600). Thus, a partitioned tensor can be stored across multiple PMUs, and individual partitions can be at least in part concurrently processed by multiple PCUs.

Figure 7:
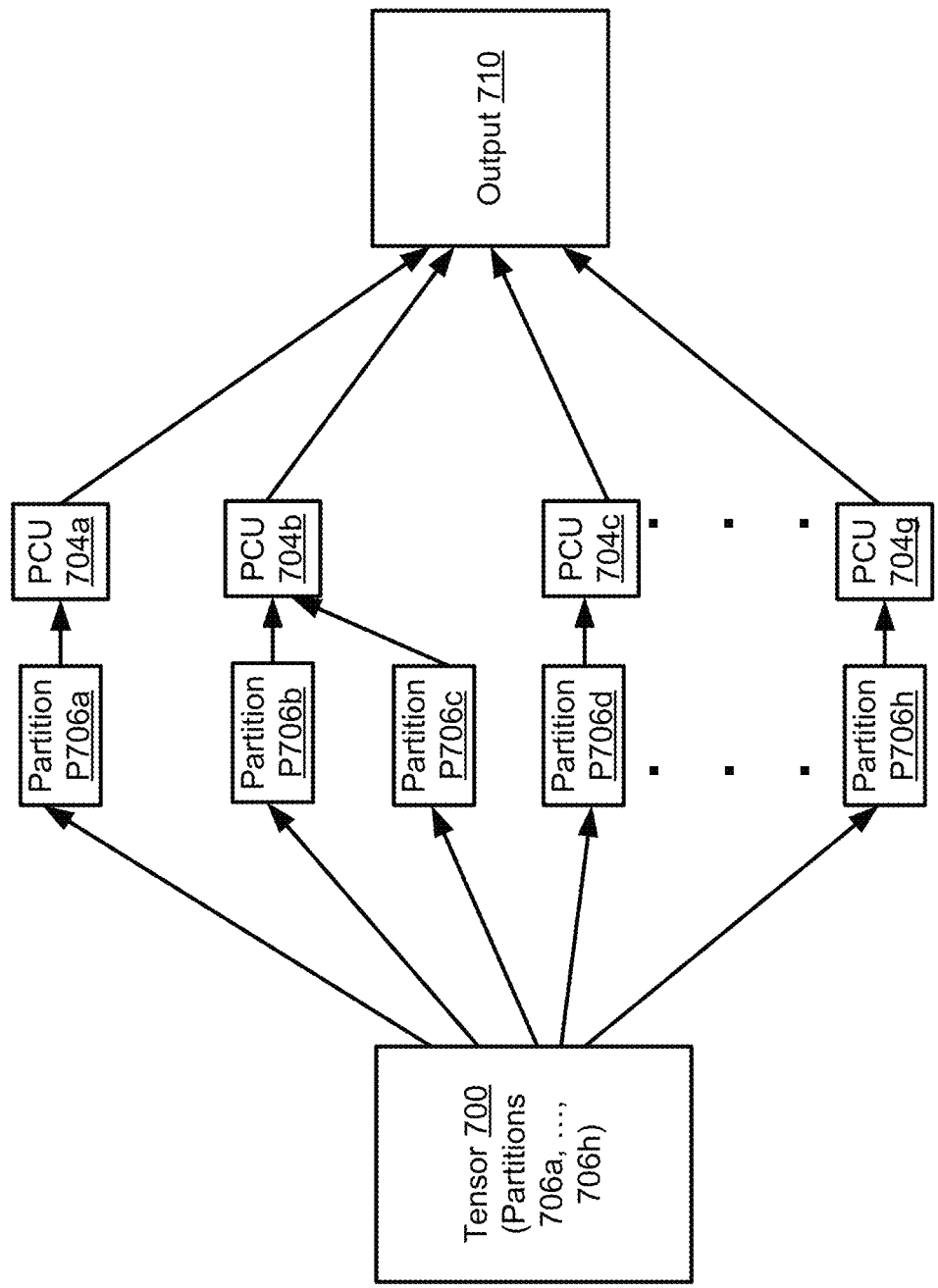
FIG. 7 illustrates an example logical mapping of different partitions of a tensor to two or more PCUs.

FIG. 7 illustrates an example logical mapping of different partitions of a tensor 700 to two or more PCUs (see FIG. 3 that illustrates various PCUs). The tensor 700 is partitioned into example partitions 706a, . . . , 706h. Although in this example the tensor 700 is partitioned in 8 partitions, such as number of partitions is merely an example and is not limiting. The number of partitions can be based on a number of factors, such as capacity and/or bandwidth of various configurable units, as discussed with respect to FIG. 6. The manner in which the tensor 700 is partitioned (e.g., whether each partition comprises one or more corresponding rows, one or more corresponding columns, or one or more corresponding tiles of the tensor) is implementation specific, and FIG. 6 illustrates various example partitioning arrangements.

In an embodiment, individual PCUs 704 process corresponding one or more partitions 706 of the tensor 700. Merely as an example, partition 706a is to be processed by a PCU 704a, partitions 706b, 706c are to be processed by a PCU 704b, partition 706d is to be processed by a PCU 704c, partition 706h is to be processed by a PCU 704g, and so on. Thus, FIG. 7 illustrates an example mapping between the partitions 706 and the PCUs 704, i.e., specifies one or more partitions that are processed by individual PCUs. Note that the processing performed by various PCUs may be at least in part concurrent. For example, the PCU 704a may process the partition 706a at least in part concurrently with processing of the partition 706b by the PCU 704b.

In an example, each partition can form a corresponding read channel. For example, there are 8 read channels corresponding to the 8 partitions, and outputs of individual ones of the 8 read channels are provided to a corresponding PCU 704. In an example, each read channel can be operated independently. Outputs of individual PCUs 704 are concatenated or otherwise combined to form an output 710.

Figure 8:
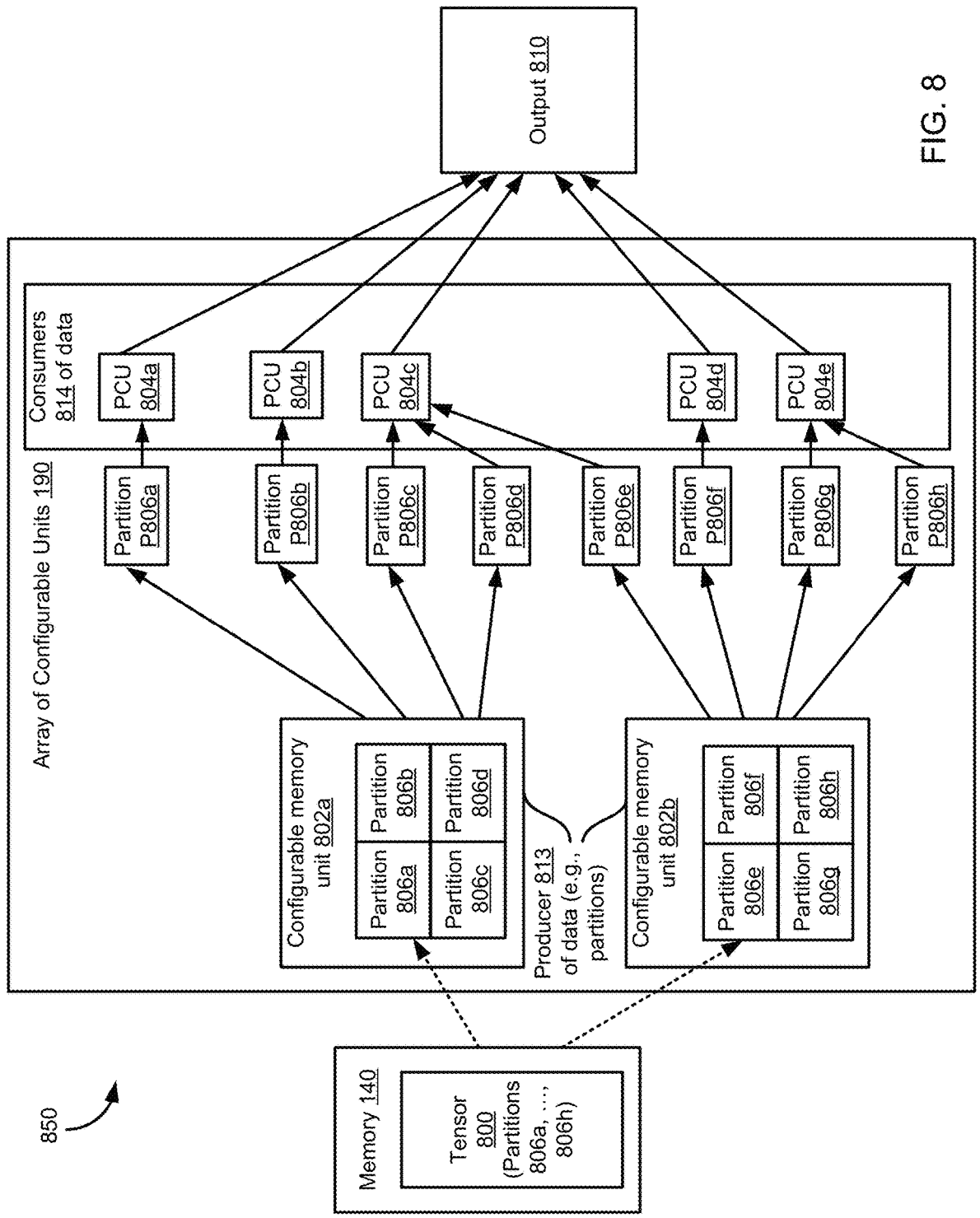
FIG. 8 illustrates a system for partitioning a tensor and storing the partitions in configurable memory units, and processing the partitions by corresponding configurable processing units.

FIG. 8 illustrates a system 850 for partitioning a tensor and storing the partitions in configurable memory units, and processing the partitions by corresponding configurable processing units (such as PCUs 804). In the system 850, a tensor 800 is partitioned into partitions 806a, . . . , 806h, as discussed with respect to FIGS. 6 and 7. The partitions are stored in configurable memory units 802a and 802b included in the array of configurable units 190. The configurable memory units 802a and 802b are, for example, PMUs illustrated in FIG. 3. Although FIG. 8 illustrates two configurable memory units 802 storing the partitions, in another example, more than two such configurable memory units can be used to store the partitions. In FIG. 8 and merely as an example, partitions 806a, 806b, 806c, and 806d are stored in the configurable memory unit 802a, and partitions 806e, 806f, 806g, and 806h are stored in the configurable memory unit 802b.

In one example, the tensor 800, prior to being partitioned, is initially stored in the off-chip memory 140 (see FIG. 1). Subsequently, various partitions of the tensor 800 are loaded from the memory 140 to the configurable memory units 802a, 802b. In another example, the partitions 806a, . . . , 806h can be loaded directly from the host memory 128 to the configurable memory units 802, thereby bypassing the memory 140. In yet another example, the partitions 806 are generated by the PCUs 804 and stored directly on the configurable memory units 802a, 802b. Thus, loading of the partitions from the memory 140 to the configurable memory units 802a, 802b is just an example, and hence, the transmission of partitions from the memory 140 to the configurable memory units 802a, 802b are illustrated using dotted lines.

Similar to FIG. 7, in the system 850 of FIG. 8, each PCU 804 processes one or more corresponding partitions 806. For example, the partition 806a is to be processed by PCU 804a, the partition 806b is to be processed by PCU 804b, the partitions 806c, 806d, 806e are to be processed by PCU 804c, the partitions 806f is to be processed by PCU 804d, and the partitions 806g, 806h are to be processed by PCU 804e, as illustrated. Thus, each PCU 804 receives the corresponding partitions from the configurable memory units 802a and/or 802b, and processes the corresponding partitions.

From the perspective of transmission of the partitions 806 from the configurable memory units 802 to the PCUs 804, the configurable memory units 802a, 802b act as producers 813 of data (e.g., the partitions), whereas the PCUs 804a, . . . , 804e act as consumers 814 of data.

In an example, partitions 806 are transmitted from the configurable memory units 802 to the PCUs 804 via one or more data buses, such as those interconnecting various PMUs to various PCUs via one or more corresponding switches, as illustrated in FIG. 3.

Figure 9:
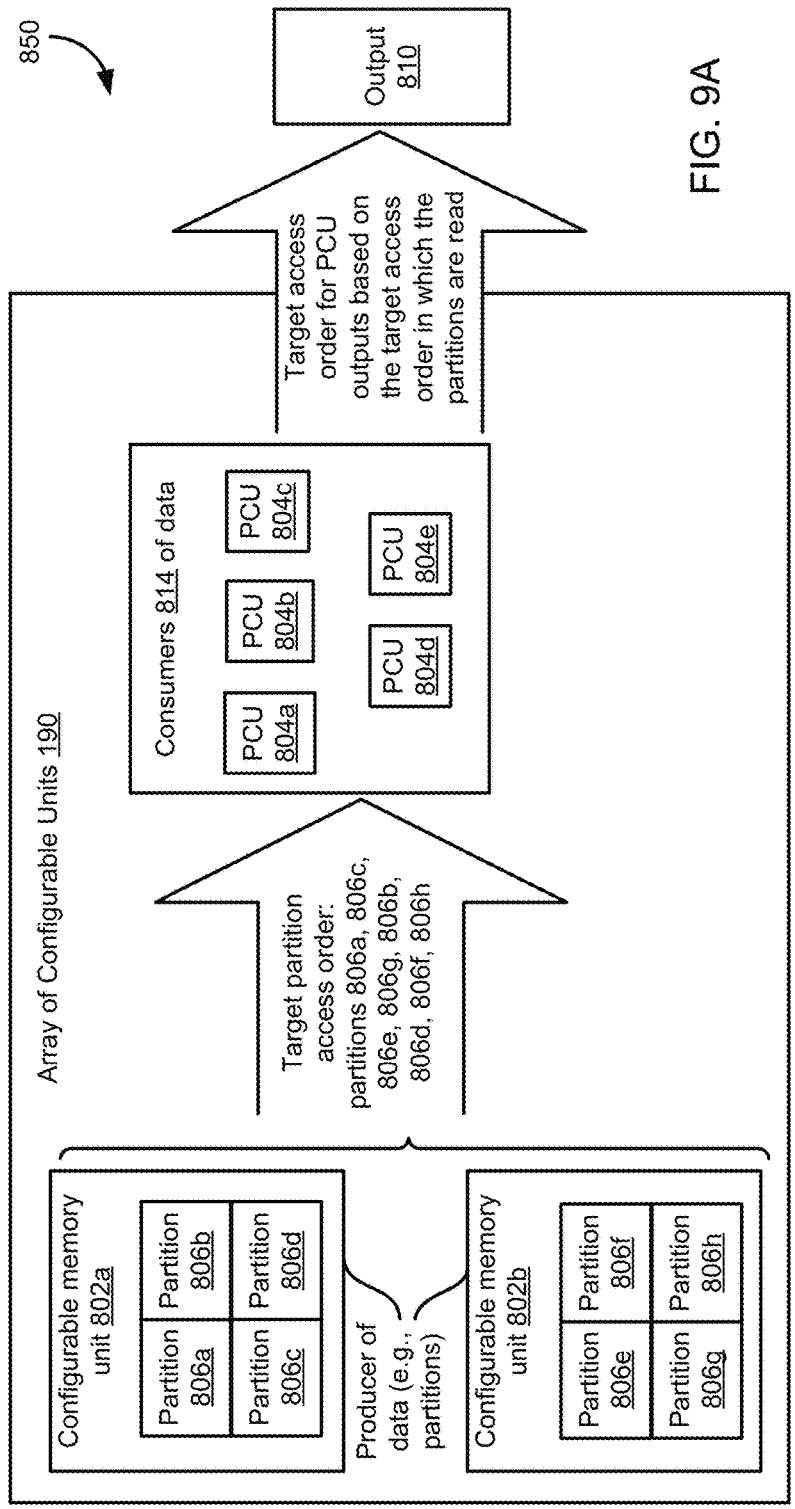
FIG. 9A illustrates at least a part of the system of FIG. 8, and further illustrates a desired partition access pattern.
FIG. 9B illustrates individual partitions being assigned corresponding sequence identifications (IDs), to implement a correct pattern or order of partition access.

FIG. 9A illustrates at least a part of the system 850 of FIG. 8, and further illustrates a target partition access order. For example, for correct processing of the partitions by consumers 814 of data (such as the PCUs 804a, . . . , 804e), the partitions 806a, . . . , 806h have to be read in a specific order. Merely as an example, a target or desired partition access order is partition 806a, partition 806c, partition 806e, partition 806g, partition 806b, partition 806d, partition 806f, and partition 806h. Thus, the consumers 814 are expected to receive the partitions in this order (e.g., partition 806a has to be transmitted first to the consumers 814, followed by partition 804c, followed by partition 804e, and so on).

FIG. 9B illustrates individual partitions being assigned corresponding sequence identifications (IDs), to implement the correct pattern or order of partition access. For example, to implement the correct partition access order (e.g., to ensure that the partitions are accessed in the correct order), each partition 806 is assigned a corresponding sequence ID 907, based on the target partition access order. For example, the target partition access order is partition 806a, partition 806c, partition 806e, partition 806g, partition 806b, partition 806d, partition 806f, partition 806h. Accordingly, the partition 806a is assigned a sequence ID 907_1, the partition 806c is assigned a sequence ID 907_2, the partition 806e is assigned a sequence ID 907_3, the partition 806g is assigned a sequence ID 907_4, and so on, as illustrated in FIG. 9B.

Thus, the sequence IDs 907_1, . . . , 907_8 specify an order in which corresponding partitions are to be transmitted to the consumers 814. For example, partition 806a corresponding to the sequence ID 907_1 is to be output initially to the consumers 814, followed by partition 806c of the sequence ID 907_2, followed by partition 806e of the sequence ID 907_3, followed by partition 806g of the sequence ID 907_4, followed by partition 806b of the sequence ID 907_5, and so on.

In an embodiment, a sequence ID 907 associated with a partition 806 is stored in metadata associated with the partition 806. In an example, the sequence IDs 907 can be generated by a sequence ID generation logic executed, merely as an example, by the AG illustrated in FIG. 3, by a PCU, and/or PMU, or by another component of the system illustrated in FIGS. 1-5, and each such generated sequence ID of a partition is stored in the corresponding metadata of the partition. Thus, the metadata including the sequence IDs for various partitions specify the order in which the partitions are to be transmitted to the consumers.

Also illustrated in FIG. 9B are identification of memory units 802 that own addresses corresponding to various sequence IDs (or addresses corresponding to various partitions associated with the various sequence IDs). For example, a third row of a table depicted in FIG. 9B illustrates that the memory unit 802a stores the partitions 806a, 806b, 806c, and 806d associated with corresponding sequence IDs 907_1, 907_5, 907_2, and 907_6, respectively.

Similarly, the memory unit 802b stores the partitions 806e, 806f, 806g, and 806h associated with corresponding sequence IDs 907_3, 907_7, 907_4, and 907_8, respectively.

Figure 10:
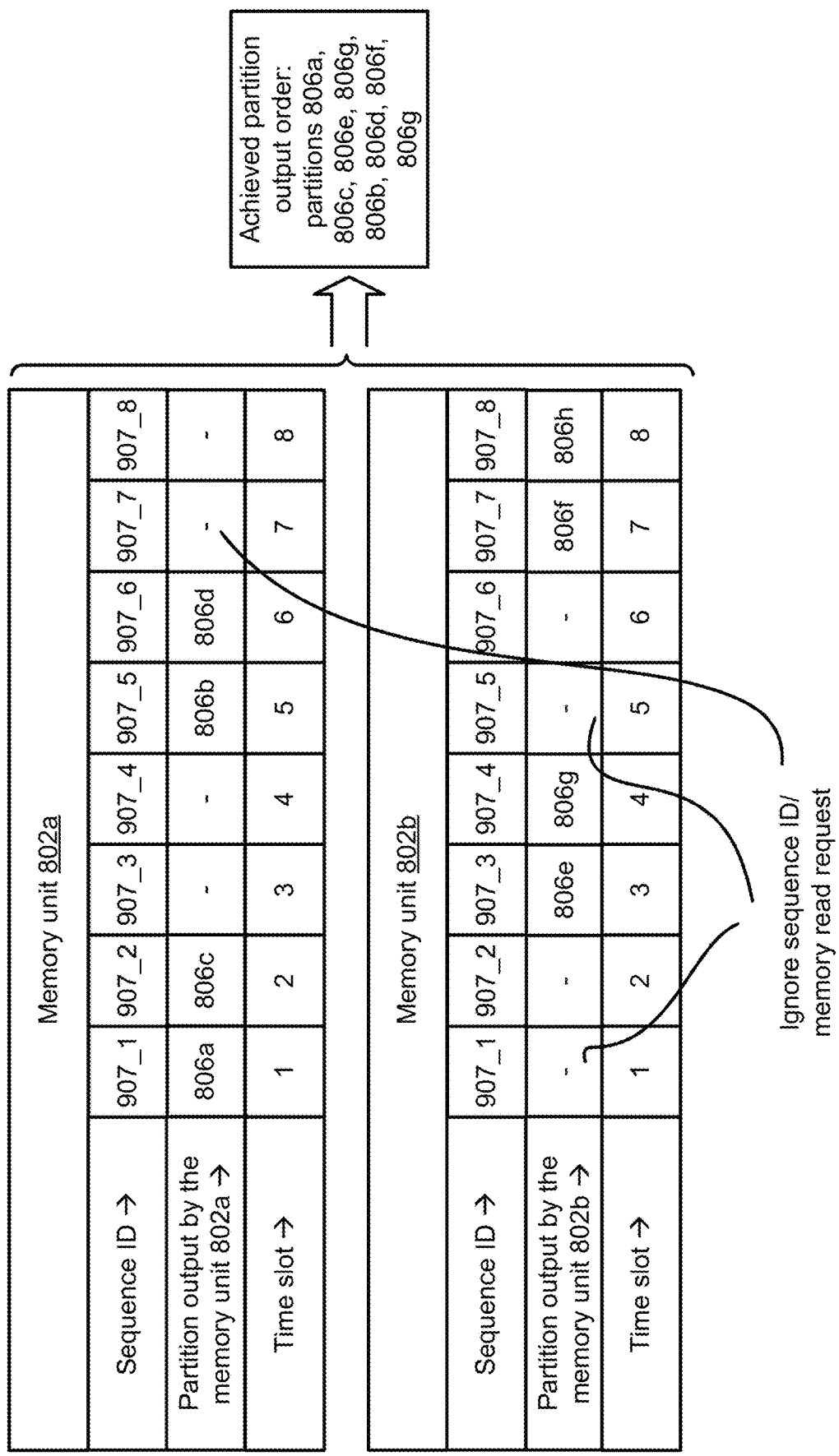
FIG. 10 illustrates various memory units selectively outputting corresponding partitions to one or more consumers of the partitions, based on associated sequence IDs, to achieve a target partition access order of various partitions.

FIG. 10 illustrates various memory units 802 selectively outputting corresponding partitions to the consumers 814 (see FIG. 9A), based on the associated sequence IDs, to achieve the target partition access order of partition 806a, partition 806c, partition 806e, partition 806g, partition 806b, partition 806d, partition 806f, partition 806h. For example, for each sequence ID, if a memory unit owns the corresponding address, the corresponding partition is output; and if the memory unit does not own the corresponding address, the memory unit ignores the sequence ID.

Note that time slots illustrated in FIG. 10 and one or more subsequent figures are implementation specific. For example, a time slot can include a single clock cycle, or a collection of multiple clock cycles required for a memory unit 802 to output a corresponding partition, or one or more data bus clock rates (where the data bus transmits the partitions from the producers to the consumers 814), or another amount of time required for a memory unit 802 to output a corresponding partition.

For example, during a first time slot, the memory unit 802a initially starts with the sequence ID 907_1. As the memory unit 802a owns the memory address and stores the partition 806a corresponding to the sequence ID 907_1, the memory unit 802a outputs the corresponding partition 806a during the first time slot. During the first time slot, memory unit 802b determines that a partition corresponding to the sequence ID 907_1 is not stored in the memory unit 802b (i.e., the memory unit 802b does not own the memory address corresponding to the sequence ID 907_1), and hence, the memory unit 802b ignores this sequence ID (i.e., does not output any partition corresponding to this sequence ID).

During a second time slot, the memory unit 802a checks the next sequence ID 907_2, and outputs the corresponding partition 806c (e.g., as the memory unit 802a owns the memory address and stores the partition 806c corresponding to this sequence ID). During the second time slot, memory unit 802b determines that a partition corresponding to the sequence ID 907_2 is not stored in the memory unit 802b (i.e., the memory unit 802b does not own the memory address corresponding to the sequence ID 907_2), and hence, the memory unit 802b ignores this sequence ID (i.e., does not output any partition corresponding to this sequence ID).

During a third time slot, the memory unit 802a checks the third sequence ID 907_3, and determines that a partition corresponding to the sequence ID 907_3 is not stored in the memory unit 802a (i.e., the memory unit 802a does not own the memory address corresponding to the sequence ID 907_3), and hence, the memory unit 802a ignores this sequence ID (i.e., does not output any partition corresponding to this sequence ID). During the third time slot, memory unit 802b outputs the corresponding partition 806e (e.g., as the memory unit 802b owns the memory address and stores the partition 806e corresponding to the sequence ID 907_3).

During a fourth time slot, the memory unit 802a checks the fourth sequence ID 907_4, and determines that a partition corresponding to the sequence ID 907_4 is not stored in the memory unit 802a (i.e., the memory unit 802a does not own the memory address corresponding to the sequence ID 907_4), and hence, the memory unit 802a ignores this sequence ID (i.e., does not output any partition corresponding to this sequence ID). During the fourth time slot, memory unit 802b outputs the corresponding partition 806g (e.g., as the memory unit 802b owns the memory address and stores the partition 806g corresponding to the sequence ID 907_4).

This process continues until all the partitions are output by the memory units 802a, 802b. Note that the partition output order achieved is partitions 806a, 806c, 806e, 806g, 806b, 806d, 806f, 806h, which is the target order indicated by the sequence IDs 907. Thus, in FIG. 10, the memory units 802a, 802b output the partitions in the target output order to the consumers 814.

In FIG. 10, the memory units 802a and 802b have to operate synchronously. For example, if the memory unit 802a is unable to output a corresponding partition during a specific time slot (e.g., due to a stall condition in the memory unit, due to back pressure on the memory unit, etc.), the other memory unit 802b has to be aware of that and pause outputting its partition during the next time slot (e.g., so that the target partition output order is maintained).

However, in some examples, the memory units 802a and 802b may operate independently and asynchronously. Thus, the memory unit 802a outputs the partitions 806a in parallel with, and independent of, the memory unit 802a outputting the partition 806e, for example. Thus, in some such scenarios, the arrangement discussed with respect to FIG. 10 may not be able to output the patterns in the correct target order.

For example, intra-memory order is preserved by the arrangement of FIG. 10. Thus, in the arrangement of FIG. 10, memory unit 802a will always output partitions 806a, 806c, 806b, and 806d in that order. Similarly, memory unit 802b will always output partitions 806e, 806g, 806f, and 806h in that order. However, inter-memory ordering may not be preserved by the arrangement of FIG. 10. For example, due to asynchronous operations between the two memory units 802a, 802b, as discussed above, in some examples (and although not illustrated in FIG. 10), the memory unit 802b can output partition 806e prior to the memory unit 802a outputting partition 806c (e.g., if the memory unit 802a is stalled during the second and third time slots), thereby the system 850 being unable to achieve the target partition output order.

Figure 11A:
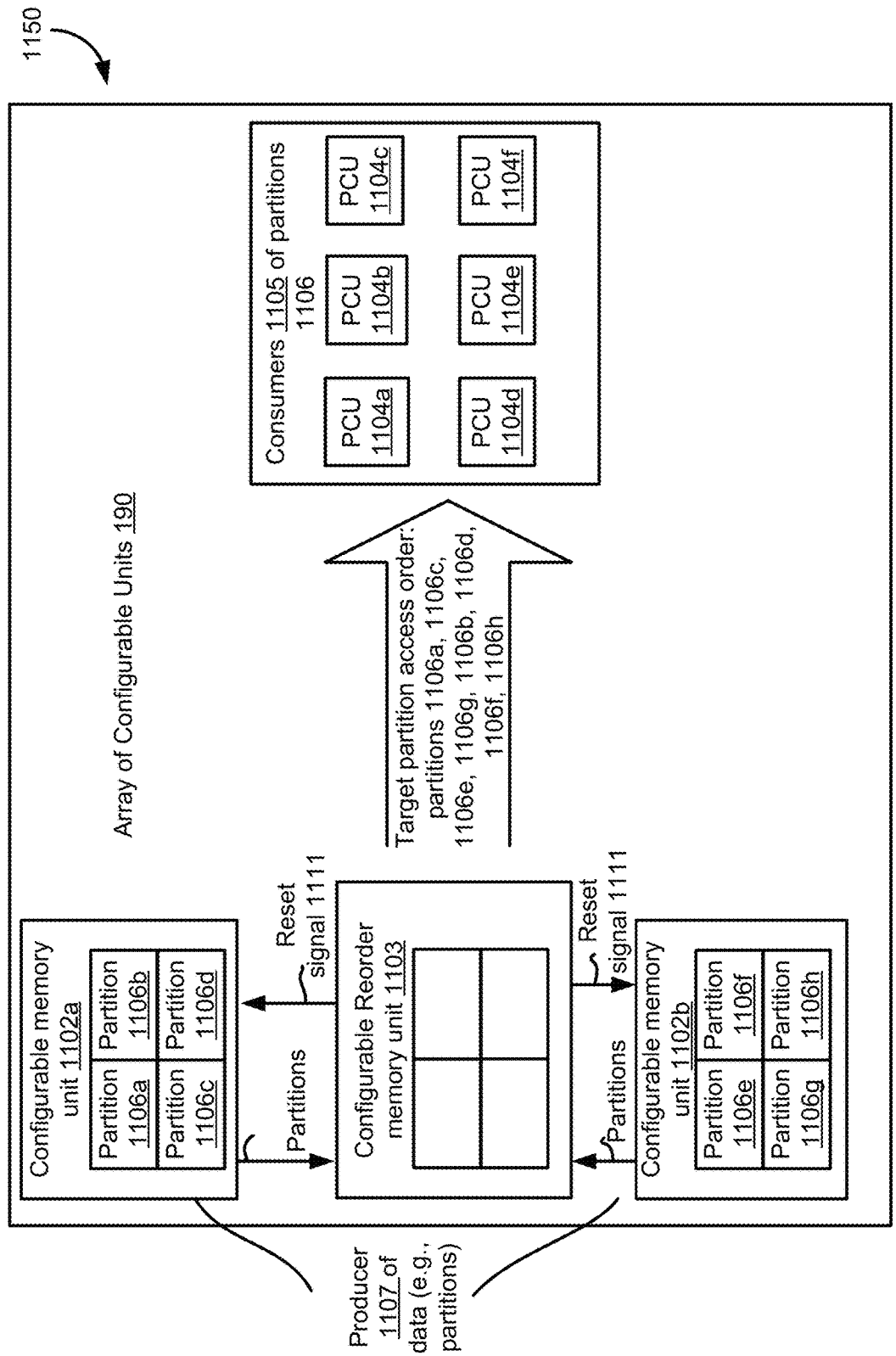
FIG. 11A illustrates a system including a configurable reorder memory unit to receive partitions from multiple configurable memory units, and to output the received partitions in a correct order to consumers of the partitions.

FIG. 11A illustrates a system 1150 including a configurable reorder memory unit to receive partitions from multiple configurable memory units, and to output the received partitions in correct order to consumers 1105 of the partitions. In the system 1150, a tensor 1100 (the full tensor 1100 is not illustrated in FIG. 11A) is partitioned into partitions 1106a, 1106b, 1106c, 1106d, 1106e, 1106f, 1106g, and 1106h, as discussed with respect to FIGS. 6 and 7. The partitions are stored in configurable memory units 1102a and 1102b included in the array of configurable units 190. The configurable memory units 1102a and 1102b are, for example, PMUs illustrated in FIG. 3. Although FIG. 11 illustrates two such configurable memory units 1102 storing the partitions, in another example, more than two such configurable memory units can be used to store the partitions. In FIG. 11 and merely as an example, partitions 1106a, 1106b, 1106c, and 1106d are stored in the configurable memory unit 1102a, and partitions 1106e, 1106f, 1106g, and 1106h are stored in the configurable memory unit 1102b.

Similar to FIGS. 7 and 8, in the system 1150 of FIG. 11, each PCU 1104 processes one or more corresponding partitions 1106, although the mapping between the partitions and the PCUs are not specifically illustrated in FIG. 11A. The PCUs 1104a, . . . , 1104f are generally illustrated as being consumers 1105 of the partitions 1106. The configurable memory units (also referred to as memory units) 1102a, 1102b are generally illustrated as being producers 1107 of the partitions 1106.

FIG. 11A also illustrates a desired or target partition access order, in which the consumers 1105 expect to receive the partitions. For example, for correct processing of the partitions by consumers 1105 (such as the PCUs 1104a, . . . , 1104f), the partitions 1106a, . . . , 1106h have to be read in a specific target order. Merely as an example, the target partition access order is partition 1106a, partition 1106c, partition 1106e, partition 1106g, partition 1106b, partition 1106d, partition 1106f, and partition 1106h. Thus, the consumers 1105 are expected to receive the partitions in this order (e.g., partition 1106a has to be transmitted first to the consumers 1105, followed by partition 1104c, followed by partition 1104e, and so on).

In an embodiment, the system 1150 includes a configurable reorder memory unit 1103. The configurable reorder memory unit 1103 is, for example, a PMU illustrated in FIG. 3. The configurable reorder memory unit 1103 (also referred to herein as reorder unit 1103) receives individual partitions 1106 from the memory units 1102 (e.g., not necessarily in the target order), reorders the received partitions, and transmits the partitions in the correct order to the consumers 1105 of the partitions, as will be discussed herein in further detail.

As seen in FIG. 11A, the reorder memory unit 1103 can, at any given time, store at most 4 partitions. That is, the reorder unit memory 1103 is not large enough to store all the partitions 1106a, . . . , 1106h of the tensor 1100. Rather, at a time, the reorder memory unit 1103 can store only a subset of the partitions 1106a, . . . , 1106h of the tensor 1100.

FIG. 11B illustrates individual partitions being assigned corresponding sequence identifications (IDs), to implement the correct pattern or order of partition access, where there are multiple cycles of the sequence IDs, and where a total number of sequence IDs in each cycle of sequence IDs is based on a storage capacity of the reorder memory unit 1103 of the system 1150 of FIG. 11A. For example, to implement the correct partition access order (e.g., to ensure that the partitions are accessed in the correct order), each partition 1106 is assigned a corresponding sequence ID 1107, based on the target partition access order.

Furthermore, there are two cycles 1109a and 1109b of sequence IDs depicted in FIG. 11B. Each cycle includes a total number of sequence IDs that corresponds to a maximum number of partitions that the reorder unit 1103 can store. In the example of FIG. 11A, the reorder unit 1103 can store a maximum of four partitions. Accordingly, each cycle 1109 in FIG. 11B comprises at most four sequence IDs.

For example, in FIG. 11B, the first cycle 1109a of sequence IDs includes sequence IDs 1107_a_1, 1107_a_2, 1107_a_3, and 1107_a_4, where the phrase "_a_" in these sequence IDs indicate that these sequence IDs are associated with the first cycle 1109a. The second cycle 1109b of sequence IDs includes sequence IDs 1107_b_1, 1107_b_2, 1107_b_3, and 1107_b_4, where the phrase "_b_" in these sequence IDs indicate that these sequence IDs are associated with the second cycle 1109b. As will be discussed in further detail, a reset signal 1111 (also referred to herein as read ready signal) is issued by the reorder unit between the two cycles 1109a and 1109b.

Also, referring to FIGS. 11A and 11B, the target partition access order is partitions 1106a, 1106c, 1106e, 1106g, 1106b, 1106d, 1106f, 1106h (e.g., partition 1106a has to be transmitted first to the consumers 1105, followed by partition 1106c, followed by partition 1106e, and so on). In an embodiment, the partitions 1106 are assigned corresponding sequence IDs, based on this target order. For example, the first four partitions 1106a, 1106c, 1106e, 1106g in the target order are assigned corresponding sequence IDs 1107_a_1, 1107_a_2, 1107_a_3, and 1107_a_4, respectively, of the first cycle 1109a, as illustrated in FIG. 11B. The remaining four partitions 1106b, 1106d, 1106f, 1106h in the target order are assigned corresponding sequence IDs 1107_b_1, 1107_b_2, 1107_b_3, and 1107_b_4, respectively, of the second cycle 1109b.

Thus, the sequence IDs specify an order in which corresponding partitions are to be transmitted to the consumers 1105. For example, all the partitions associated with the first cycle 1109a of sequence IDs are initially transmitted to the consumers 1105. After completion of transmission of each of the partitions associated with the first cycle 1109a of sequence IDs, the reorder unit 1103 issues the reset signal 1111, and then all the partitions associated with the second cycle 1109b are transmitted to the consumers 1105, as will be discussed herein in further detail. Moreover, for each cycle of sequence IDs, the underlying sequence IDs also specify an order in which the corresponding partitions are transmitted to the consumers 1105. For example, for first cycle 1109a, partitions corresponding to sequence IDs 1107_a_1, 1107_a_2, 1107_a_3, and 1107_a_4 are to be transmitted in that order to the consumers 1105.

As discussed herein earlier, the reorder memory unit 1103 can, at any given time, store at most 4 partitions. That is, the reorder memory unit 1103 is not large enough to store all the partitions 1106a, . . . , 1106h of the tensor 1100. Rather, at a time, the reorder unit 1103 can store only a subset of the partitions 1106a, . . . , 1106h of the tensor 1100. For example, the reorder unit 1103 has a buffer depth that matches the partitions 1106a, 1106c, 1106e, and 1106g of the first cycle 1109a of sequence IDs, and the reorder memory unit 1103 has a buffer depth that matches the partitions 1106b, 1106d, 1106f, and 1106h of the second cycle 1109b of sequence IDs.

Figure 11C:
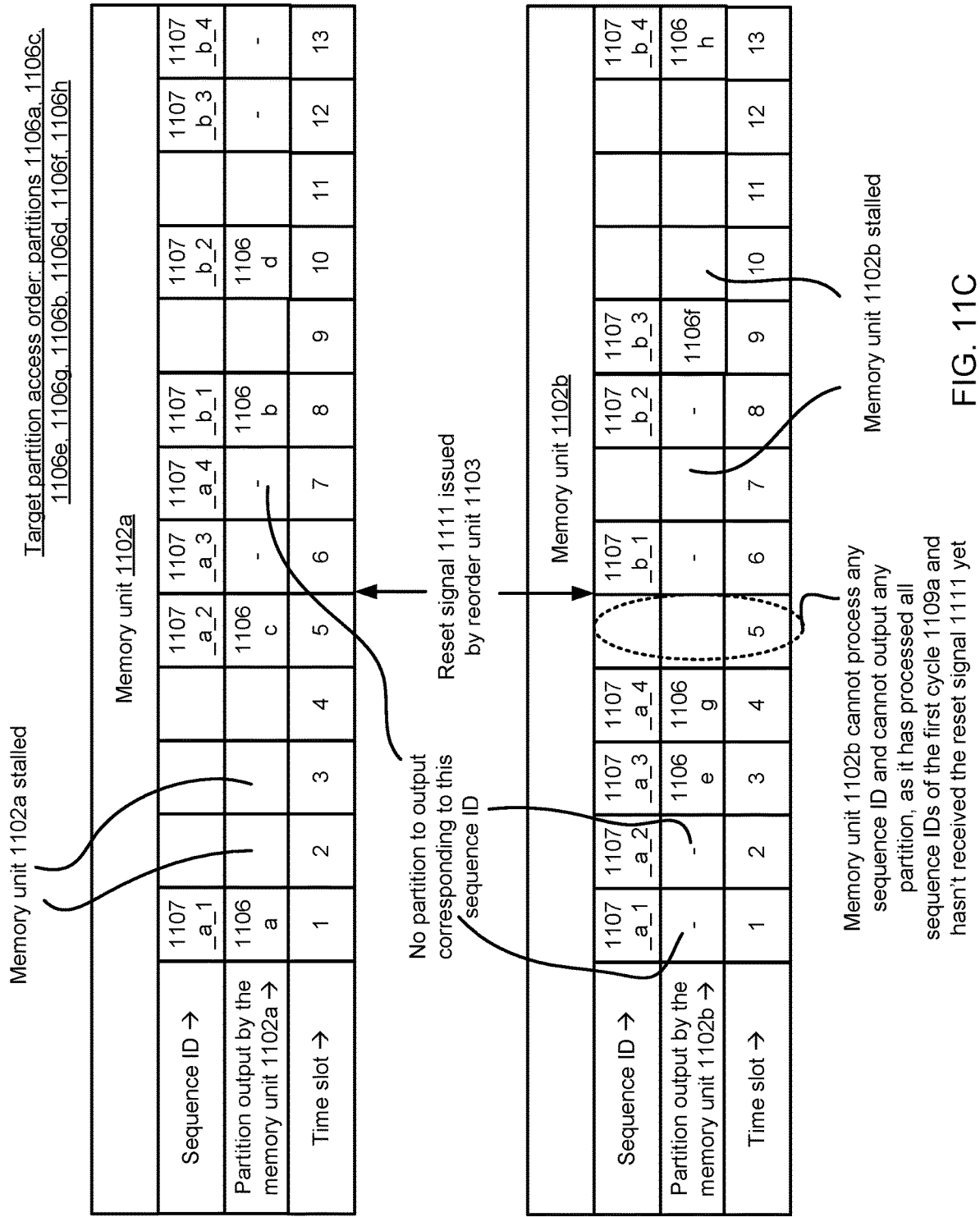
FIG. 11C illustrates various memory units selectively outputting corresponding partitions to a configurable reorder memory unit, based on associated cycles of sequence IDs, to achieve a target partition access order.

FIG. 11C illustrates various memory units 1102a, 1102b selectively outputting corresponding partitions to the configurable reorder memory unit 1103 (see FIG. 11A), based on the associated cycles of sequence IDs 1109a, 1109b, to achieve the target partition access order of partitions 1106a, . . . , 1106h.

In FIG. 11C, illustrated are orders in which individual ones of the memory units 1102a, 1102b outputs various partitions during various time slots to the reorder unit 1103. Unlike FIG. 10, in FIG. 11C the operations of the memory units 1102a, 1102b need not be synchronous, and each memory unit processes various sequence IDs of a specific cycle of sequence IDs independently (e.g., processing of sequence IDs by the memory unit 1102a is independent of, and asynchronous from, processing of sequence IDs by the memory unit 1102b). A memory unit 1102 has to receive a reset signal 1111 from the reorder unit 1103, before moving from sequence IDs of a specific cycle to the sequence IDs of the next cycle.

For example, referring generally to FIGS. 11A, 11B, and 11C, and specifically to FIG. 11C, at a first time slot, the memory units 1102a and 1102b check to determine if an address of a partition associated with the sequence ID 1107_a_1 of the cycle 1109a is owned by the corresponding memory unit. As illustrated in FIG. 11B, the partition 1106a is associated with the sequence ID 1107_a_1 of the cycle 1109a. Accordingly, during the first time slot of FIG. 11C, the memory unit 1102a determines that the address of the partition 1106a associated with the sequence ID 1107_a_1 of the cycle 1109a is owned by the memory unit 1102a, and accordingly, the memory unit 1102a outputs the partition 1106a to the reorder unit 1103. On the other hand, during the first time slot of FIG. 11C, the memory unit 1102b determines that the address of the partition 1106a associated with the sequence ID 1107_a_1 of the cycle 1109a is not owned by the memory unit 1102b, and accordingly, the memory unit 1102b does not output anything to the reorder unit 1103 during the first time slot.

Merely as an example and without limiting the scope of this disclosure, during a second time slot, a third time slot, and a fourth time slot, the memory unit 102a is unable to process any sequence ID. For example, the memory unit 102a may be stalled due to backpressure from the network. Accordingly, the memory unit 102a does not process any sequence ID and does not output any partition during the second, third, and fourth time slots. This is symbolically illustrated by a blank box for the sequence IDs and for the memory units 1102a for the second, third, and fourth time slots.

On the other hand, during the second time slot, the memory unit 1102b is able to process the sequence ID 1107_a_2, and the memory unit 1102b determines that the address of the partition 1106c associated with the sequence ID 1107_a_2 of the cycle 1109a is not owned by the memory unit 1102b, and accordingly, the memory unit 1102b does not output anything to the reorder unit 1103 during the second time slot.

During the third time slot, the memory unit 1102b is able to process the sequence ID 1107_a_3, and the memory unit 1102b determines that the address of the partition 1106e associated with the sequence ID 1107_a_3 of the cycle 1109a is owned by the memory unit 1102b, and accordingly, the memory unit 1102b outputs the partition 1106e to the reorder unit 1103 during the third time slot.

During the fourth time slot, the memory unit 1102b is able to process the sequence ID 1107_a_4, and the memory unit 1102b determines that the address of the partition 1106g associated with the sequence ID 1107_a_4 of the cycle 1109a is owned by the memory unit 1102b, and accordingly, the memory unit 1102b outputs the partition 1106g to the reorder unit 1103 during the fourth time slot.

By the fourth time slot, the memory unit 1102b has processed all sequence IDs of the first cycle 1109a (see FIG. 11B) of sequence IDs. So, starting from the fifth time slot, the memory unit 1102b stops processing any sequence ID, until the memory unit 1102b receives the reset signal 1111 from the reorder unit 1103. Accordingly, during the fifth slot, the memory unit 1102b does not process any sequence ID and does not output any partition of the tensor 1100.

During the fifth time slot, the stalled condition of the memory unit 1102a is mitigated, and the memory unit 1102a is able to process the sequence ID 1107_a_2. The memory unit 1102a determines that the address of the partition 1106c associated with the sequence ID 1107_a_2 of the cycle 1109a is owned by the memory unit 1102a. Accordingly, the memory unit 1102a outputs partition 1106c to the reorder unit 1103 during the fifth time slot.

Figure 11D:
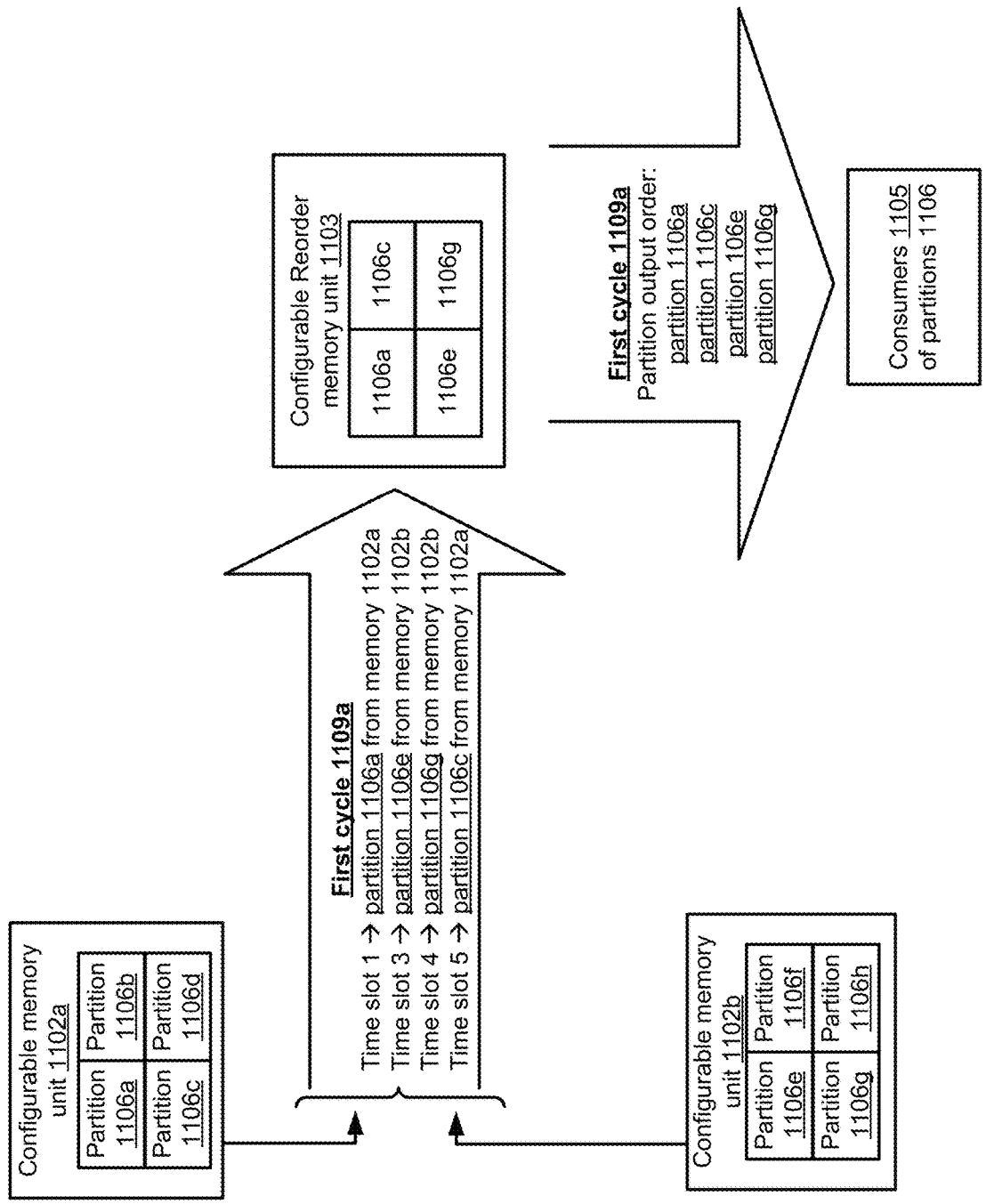
FIG. 11D illustrates reordering operation of a configurable recorder memory unit during a first cycle of sequence IDs.

By the end of the fifth time slot, the reorder unit 1103 has received partitions 1106a, 1106e, 1106g, and 1106c corresponding to the sequence IDs of the first cycle 1109a. FIG. 11D illustrates reordering operation of the configurable recorder memory unit 1103 of the system 1150 of FIG. 11A during the first cycle 1109a of sequence IDs. For example, referring to FIGS. 11C and 11D, the reorder unit 1103 has received the following partitions in the following order during the first five time slots: (i) during time slot 1, partition 1106a from memory 1102a; (ii) during time slot 3, partition 1106*e* from memory 1102*b*, (iii) during time slot 4, partition 1106*g* from memory 1102*b*, and (iv) during time slot 5, partition 1106*c* from memory 1102*a*.

The reorder unit 1103 determines the target order of the partitions by reading the sequence IDs in the metadata of the partitions. Thus, the sequence IDs provides ordering information (e.g., comprising the target order) to the reorder unit 1103. Accordingly, the reorder unit 1103 outputs these four partitions associated with the first cycle 1109*a* of sequence IDs in the following target order: partition 1106*a*, 1106*c*, 1106*e*, and 1106*g*.

The reorder unit 1103 writes the partitions in the target order of partitions 1106*a*, 1106*c*, 1106*e*, and 1106*g*, and/or outputs the partitions in this target order to the consumers 1105, as illustrated in FIG. 11D. Thus, the reorder unit 1103 reorders the partitions from a received order of partitions 1106*a*, 1106*e*, 1106*g*, and 1106*c* to the output target order of partitions 1106*a*, 1106*c*, 1106*e*, and 1106*g* transmitted to the consumers 1105.

Referring again to FIG. 11C, at the end of the fifth time slot, the reorder unit 1103 has received all the partitions 1106*a*, 1106*c*, 1106*e*, and 1106*g* associated with the sequence IDs of the first cycle 1109*a*. Accordingly, at the end of the fifth time slot, the reorder unit 1103 issues the reset signal 1111 to the memory units 1102*a*, 1102*b*, signifying that the memory units can now advance to the second cycle of sequence IDs.

However, the memory unit 1102*a* has not yet processed sequence IDs 1107_*a*_3 and 1107_*a*_4 of the first cycle 1109*a*. Accordingly, during the sixth and seventh time slots, the memory unit 1102*a* processes sequence IDs 1107_*a*_3 and 1107_*a*_4 of the first cycle 1109*a* and determines that the memory unit 1102*a* does not own the corresponding partitions. Accordingly, during the sixth and seventh time slots, the memory unit 1102*a* does not output any partition.

On the other hand, during the sixth time slot, the memory unit 1102*b* proceeds to the sequence IDs of the second cycle 1109*b* of sequence IDs (e.g., as the memory unit 1102*b* has processed all the sequence IDs of the first cycle 1109*a* and has received the reset signal 1111). For example, during the sixth time slot, the memory unit processes the sequence ID 1107_*b*_1, and the memory unit 1102*b* determines that the address of the partition 1106*b* associated with the sequence ID 1107_*b*_1 of the cycle 1109*b* is not owned by the memory unit 1102*b*, and accordingly, the memory unit 1102*b* does not output any partition to the reorder unit 1103 during the sixth time slot.

During the seventh time slot, the memory unit 1102*b* is stalled, e.g., due to back pressure from the network, or for any other appropriate reason, and is unable to process any sequence ID or output any partition during this time slot.

Prior to the eighth time slot, the memory unit 1102*a* has processed all sequence IDs of the first cycle 1109*a* and also has received the reset signal 1111. Accordingly, at the eighth time slot, the memory unit 1102*a* processes the sequence ID 1107_*b*_1 of the second cycle 1109*b*, and the memory unit 1102*a* determines that the address of the partition 1106*b* associated with the sequence ID 1107_*b*_1 of the cycle 1109*a* is owned by the memory unit 1102*a*. Accordingly, the memory unit 1102*a* outputs the partition 1106*b* to the reorder unit 1103 during the eighth time slot.

This process continues, as illustrated in FIG. 11C, and by the end of the thirteenth time slot, the partitions 1106*b*, 1106*d*, 1106*f*, and 1106*h* are output to the reorder unit.

Figure 11E:
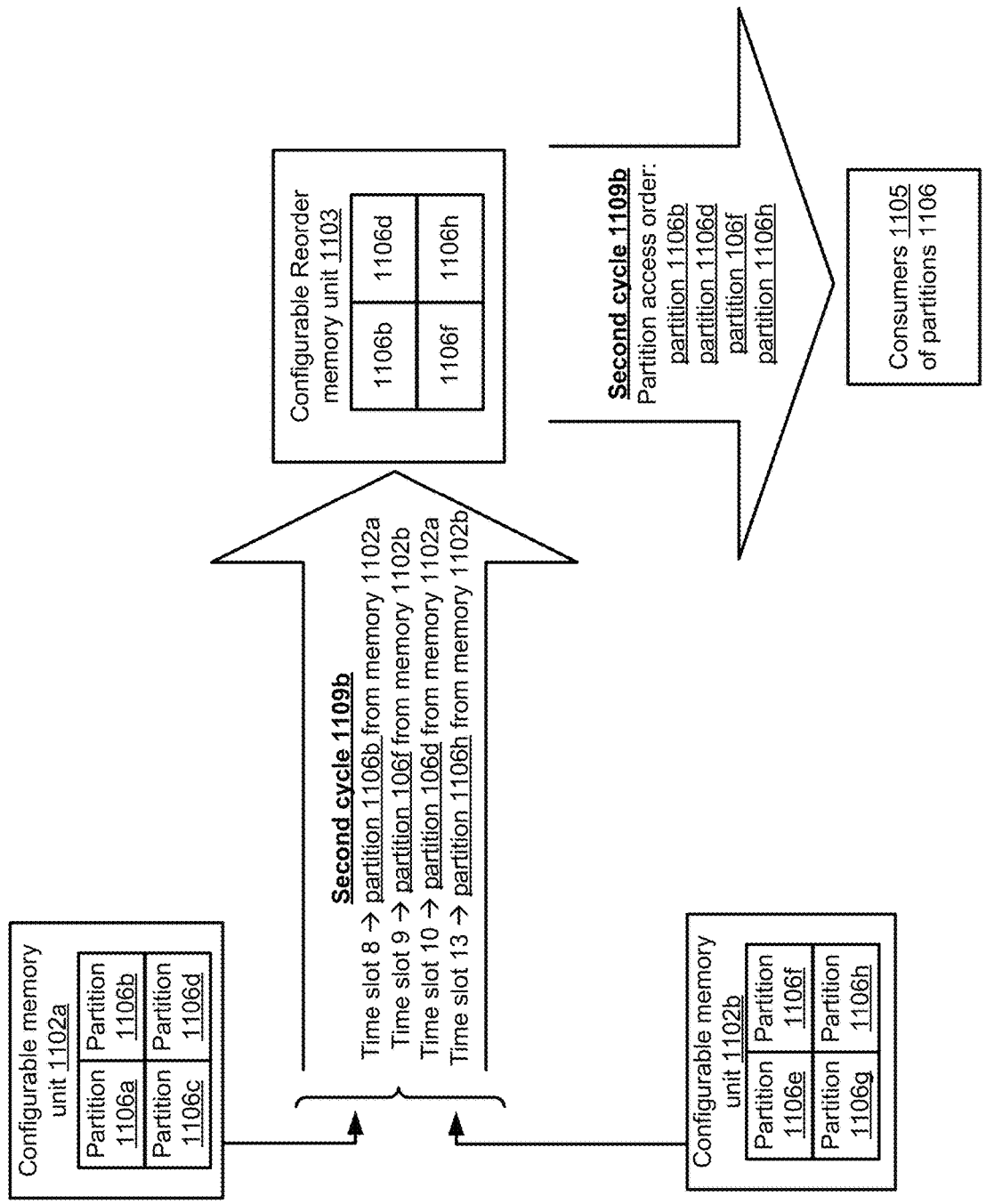
FIG. 11E illustrates reordering operation of a configurable recorder memory unit during a second cycle of sequence IDs.

Between the sixth and the thirteenth time slots, the reorder unit 1103 has received partitions 1106*b*, 1106*f*, 1106*d*, and 1106*h*. FIG. 11E illustrates reordering operation of the configurable recorder memory unit 1103 of the system 1150 of FIG. 11A during the second cycle 1109*b* of sequence IDs. For example, referring to FIGS. 11C and 11E, the reorder unit 1103 has received the following partitions in the following order during these time slots: (i) during time slot 8, partition 1106*b* from memory 1102*a*, (ii) during time slot 9, partition 1106*f* from memory 1102*b*, (iii) during time slot 10, partition 106*d* from memory 1102*a*, and (iv) during time slot 13, partition 1106*h* from memory 1102*b*. On the other hand, the reorder unit 1103 is to output these four partitions associated with the second cycle 1109*b* of sequence IDs in the following target order: partition 1106*b*, 1106*d*, 1106*f*, and 1106*h*. Accordingly, the reorder unit 1103 writes the partitions in the target order of partitions 1106*b*, 1106*d*, 1106*f*, and 1106*h*, and/or outputs the partitions in this target order to the consumers 1105, as illustrated in FIG. 11E. Thus, the reorder unit 1103 reorders the partitions from a received order of partitions 1106*b*, 1106*f*, 1106*d*, and 1106*h* to the output target order of partitions 1106*b*, 1106*d*, 1106*f*, and 1106*h* transmitted to the consumers 1105.

Figure 11F:
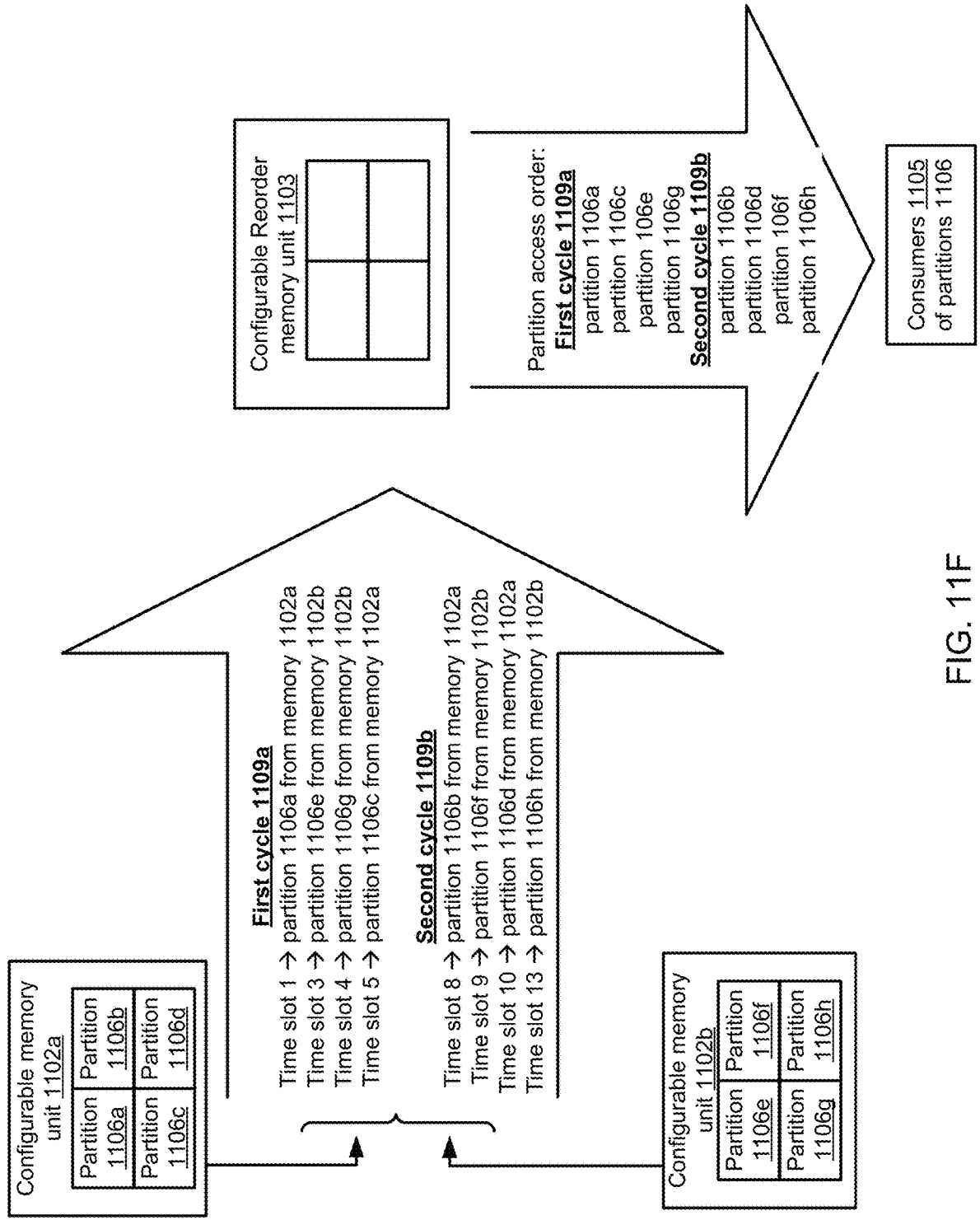
FIG. 11F illustrates reordering operation of a configurable recorder memory unit during a first cycle and a second cycle of sequence IDs.

FIG. 11F illustrates reordering operation of the configurable recorder memory unit 1103 during the first cycle 1109*a* and the second cycle 1109*b* of sequence IDs. FIG. 11F is a combination of FIGS. 11D and 11E. FIG. 11F illustrates the order in which the partitions are output by the memory units 1102*a*, 1102*b* during the first and second cycles to the reorder units 1103 (e.g., received order comprises partitions 1106*a*, 1106*e*, 1106*g*, 1106*c*, 1106*b*, 1106*f*, 1106*d*, 1106*h*). FIG. 11F also illustrates that the partitions are transmitted from the reorder unit 1103 to the consumers 1105 in the target order 1106*a*, 1106*c*, 1106*e*, 1106*g*, 1106*b*, 1106*d*, 1106*f*, and 1106*h*.

The reset signal 1111 discussed herein above is also referred to herein as a "read ready signal 1111," as the reorder unit 1103 transmits the reset signal 1111 after receiving all the partitions associated with the first cycle 1109*a* of sequence IDs and after transmitting these partitions to the consumers. Thus, once the reorder unit 1103 is ready to read the next batch of partitions (e.g., the partitions associated with the second cycle 1109*b* of sequence IDs), the reorder unit 1103 issues the reset signal 1111. Thus, initially, the reorder unit 1103 reads a first batch of partitions (the partitions associated with the first cycle 1109*a* of sequence IDs), reorders and transmits the first batch of partitions to the consumers in the target order, and then issues the reset signal when the reorder unit 1103 is ready to receive the second batch of partitions.

In FIG. 11A and various other figures, the configurable memory units 1102 are illustrated to store the partitions and are labelled as producer 1107 of partitions. However, in another example, the configurable memory units 1102 can be replaced with configurable processing units (such as PCUs), which can also act as producers of the partitions. In such an example, various PCUs generate the partitions, and directly transmit the partitions to the reorder unit 1103, thereby possibly bypassing the memory units 1102. In such an example, a PCU can generate the partitions 1106*a*, 1106*b*, 1106*c*, and 1106*d*, and transmit the generated partitions to the reorder unit 1103. Similarly, another PCU can generate the partitions 1106*e*, 1106*f*, 1106*g*, and 1106*h*, and transmit the generated partitions to the reorder unit 1103. The reorder unit 1103 reorders the partitions, and transmits the reordered partitions to the consumers 1105 in the target order, as discussed herein.

Multi-Headed Multi-Buffer

FIG. 12 illustrates an example neural network topology 1200 that employs skip connections. The example neural network topology 1200 comprises layers 1202a, ..., 1202j. The layers 1202 can implement various functions typically performed by layers of a neural network, such as non-linearities like Rectified Linear Unit (ReLU) and its variants (e.g., leaky ReLU), convolution, transpose convolution, hyperbolic tangent, sigmoid, and softmax, element-wise addition, matrix multiplication (e.g., General Matrix Multiply (GeMM)), layer normalization (e.g., batch normalization), loss functions like cross-entropy, tensor shape modifiers like transpose, and/or the like.

In the example neural network topology 1200, an output of layer 1202a is provided as an input to layer 1202b, an output of layer 1202b is provided as an input to layer 1202c, so on. Additionally, an output of layer 1202a is summed (e.g., summation 1204e) with an output of layer 1202d, and the sum is provided as an input to layer 1202e. Similarly, the output of the layer 1202a is also provided, via a summation function (e.g., summation 1204h), to layer 1202h. Similarly, the output of the layer 1202a is also provided, via a summation function (e.g., summation 1204j), to layer 1202j.

Thus, the output of the layer 1202a is provided (after summation and/or further processing) to the layers 1202b, 1202e, 1202h, and 1202j. Thus, the neural network topology 1200 contains skip connections that connect outputs of some layers (such as layers 1202a) to the inputs of one or more other layers (such as layers 1202e, 1202h, 1202j) that are much further in the network, thereby "skipping" one or more intermediate layers in between. Such connections are also referred to as "skip connections."

Assume that the layer 1202a serially outputs tensors Ta, Tb, Tk, and so on. Thus, the layer 1202a outputs tensor Ta during a first time slot, the layer 1202a outputs tensor Tb during a second time slot, the layer 1202a outputs tensor Tc during a third time slot, the layer 1202a outputs tensor Tk during a $k^{th}$ time slot, and so on. Note that a duration of the time slots illustrated in FIG. 12 and one or more subsequent figures are implementation specific. For example, a time slot can include a single clock cycle, or a collection of multiple clock cycles required for a layer to generate an output tensor, or one or more data bus clock rates (where the data bus transmits tensors between various layers), or another specific amount of time.

Thus, the layer 1202a generates the tensor Ta in the first time slot, and the tensor Ta is provided to the layer 1202b during the first time slot. The tensor Ta is further provided to the summation block 1204e preceding the layer 1202e during a fourth time slot. The tensor Ta is further provided to the summation block 1204h preceding the layer 1202h during a seventh time slot, and the tensor Ta is further provided to the summation block 1204j preceding the layer 1202j during the ninth time slot. Thus, the skip connection of FIG. 12 necessitates that the tensor Ta, which is generated during the first time slot, be stored and used during the fourth, seventh, and ninth time slots.

FIG. 13 illustrates a logical view of a multi-head multi-buffer arrangement 1300 (also referred to herein as buffer 1300). The buffer 1300 has a plurality of memory locations 1301_1, 1301_2, ..., 1301_8. Although the buffer 1300 is illustrated to include 8 memory locations, such a number of memory locations within the buffer 1300 is merely an example, and the buffer 1300 can include any number of memory locations, and the number of memory locations is implementation specific. In general, the buffer 1300 is a N-buffer that can buffer tensors, and can be used during skip connections, for example.

In an example, the buffer 1300 may act a First-In First-Out (FIFO) buffer, although other queuing techniques may also be used. For example, tensors Ta, Tb, ..., Tk generated by the layer 1202a are serially or sequentially written in the buffer 1300, at a tail end of the buffer 1300 (e.g., written sequentially in the memory location 1301_1). For example, each tensor T occupies a corresponding memory location 1301 in the buffer 1300. The tensors Ta, ..., Tk propagates through the memory locations during each time slot, and are output from the head end of the buffer (e.g., read from the memory location 1301_8), as will be discussed here in further detail.

The buffer 1300 can include multiple head-ends (e.g., where each head end forms a corresponding access point to access tensors within the buffer), from which tensors can be accessed or read. For example, assume that the tensor Ta is written in time slot 1 in the memory location 1301_1. At time slot 2, the tensor Ta will progress to the memory location 1301_2. At time slot 3, the tensor Ta will progress to the memory location 1301_3. In an example, the buffer 1300 can have a head-end or access-point at memory location 1301_3, and the tensor Ta is output by the buffer 1300 at time slot four. Similarly, the tensor Ta progresses to the memory location 1301_6 at the sixth time slot, and is also output by the buffer 1300 at time slot 7. Finally, at the eighth time slot, the tensor Ta reaches the final memory location 1301_8 and is output by the buffer 1300 at time slot nine. Thus, a specific tensor is output by the buffer 1300 (or read from the buffer 1300) once the tensor reaches the memory location 1301_3, the memory location 1301_5, and the memory location 1301_8.

Figure 14:
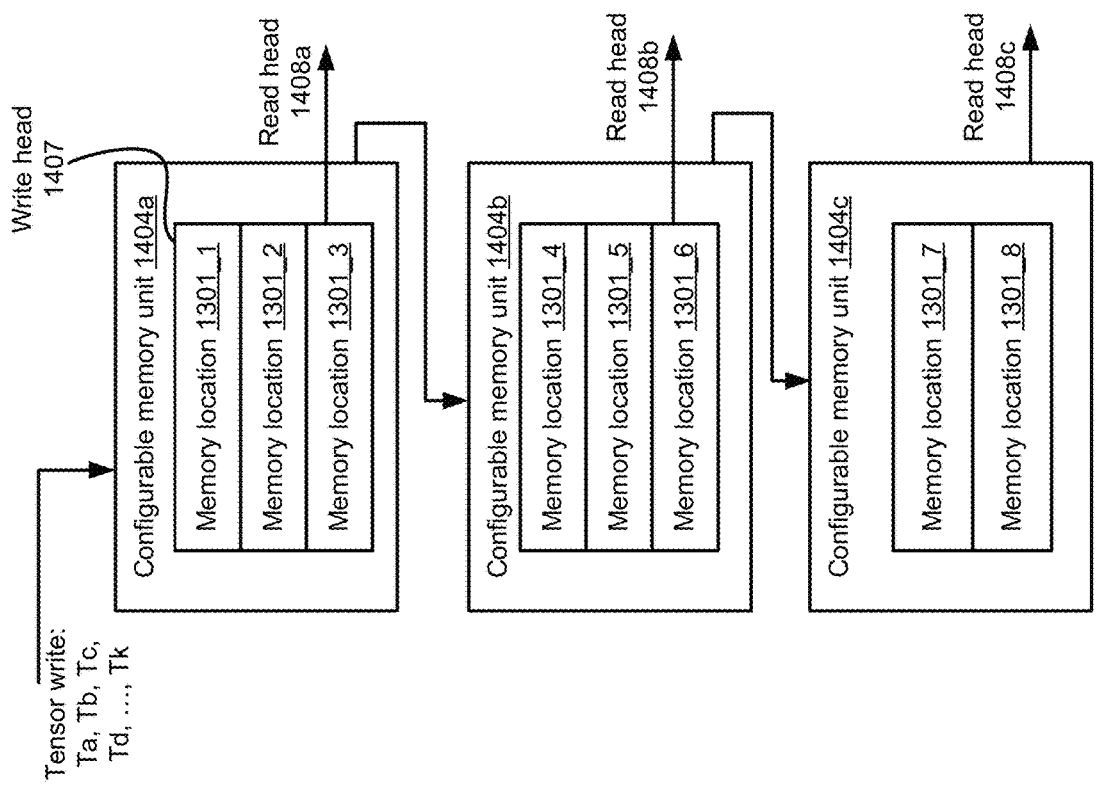
FIG. 14 illustrates a system comprising three configurable memory units implementing the multi-head multi-buffer arrangement of FIG. 13.

FIG. 14 illustrates a system 1400 comprising three configurable memory units 1404a, 1404b, 1404c implementing the multi-head multi-buffer arrangement 1300 of FIG. 13. The configurable memory units 1404a, 1404b, 1404c are, for example, PMUs illustrated in FIG. 3. For example, the PMU scratchpad can be configured to operate as a buffer. For example, the memory address space of the configurable memory unit 1404a is partitioned into three disjoint areas or sections, with each section corresponding to a respective one of the memory locations 1301_1, 1301_2, 1301_3. Similarly, the memory address space of the configurable memory unit 1404b is partitioned into three disjoint sections, with each section corresponding to a respective one of the memory locations 1301_4, 1301_5, 1301_6. Finally, the memory address space of the configurable memory unit 1404c is partitioned into two disjoint sections, with each section corresponding to a respective one of the memory locations 1301_7, 1301_8.

In an embodiment, each memory location 1301 is large enough to store an entirety of individual tensors Ta, ..., Tk. At any given time slot, a memory location 1301 is to store exactly one corresponding tensor, in an example. Thus, at any given time slot, each memory unit 1404 is to store a contiguous, disjoint set of two or more tensors.

As illustrated, the memory units 1404a, 1404b, 1404c are serially arranged, such that output of the memory unit 1404a forms an input of the memory unit 1404b, and output of the memory unit 1404b forms an input of the memory unit 1404c. The memory locations 1301_1, ..., 1301_8, thus, form a chain of memory locations, with the memory location 1301_1 being a first end location in the chain of memory locations, and the memory location 1301_2 being a second end location in the chain of memory locations. A series of tensors Ta, ..., Tk (e.g., which are output by the layer 1202a) are serially propagated through the chain of memory locations, as will be discussed herein in turn.

The chain of memory locations outputs the tensors at a read head 1408c, which is also an end memory location of the chain. There are other intermediate read heads or read access points, which can be arbitrarily located in any memory location in the chain of memory locations. Merely as an example, an intermediate read head 1408a is at a memory location 1301_3 in the chain, and another intermediate read head 1408c is at memory location 1301_6 in the chain, although any other memory location(s) may also be selected for intermediate read head(s).

Figures 15C, 15D:
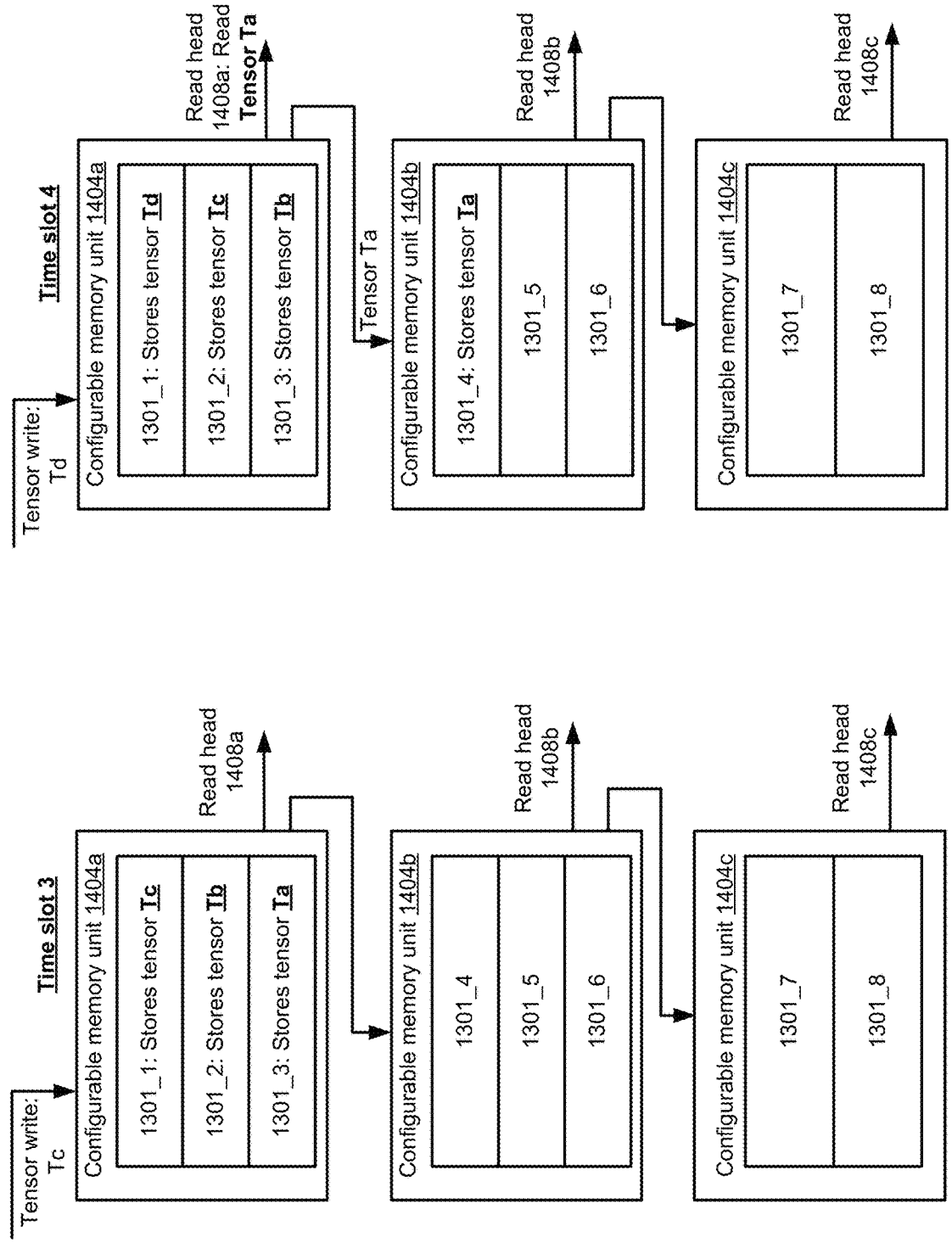
Figure 15I:
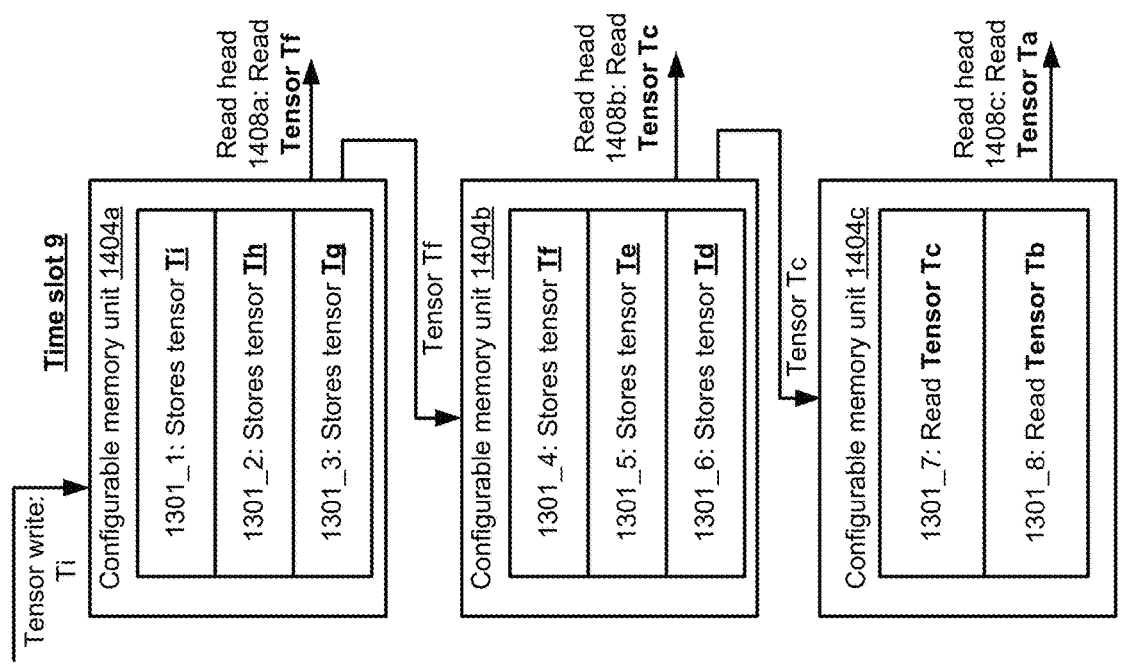

FIGS. 15A-15I illustrate operations of the system 1400 of FIG. 14 comprising the three configurable memory units 1404a, 1404b, 1404c implementing the multi-head multi-buffer arrangement 1300 of FIG. 13. Each of FIGS. 15A-15I corresponds to a respective time slot. For example, FIG. 15A illustrates contents of the memory units 1404a, . . . , 1404c during time slot 1, FIG. 15B illustrates contents of the memory units 1404a, . . . , 1404c during time slot 2, FIG. 15C illustrates contents of the memory units 1404a, . . . , 1404c during time slot 3, FIG. 15I illustrates contents of the memory units 1404a, . . . , 1404c during time slot 9, and so on.

Referring to FIG. 15A, at time slot 1, the tensor Ta (e.g., which is output by the layer 1202a, see FIG. 12) is written to a tail end of the chain of memory locations, e.g., written to the memory location 1301_1 of the memory unit 1404a.

Referring to FIG. 15B, at time slot 2, the tensor Ta advances or propagates from the memory location 1301_1 of the memory unit 1404a to the memory location 1301_2 of the memory unit 1404a, and the tensor Tb (e.g., which is output by the layer 1202a) is written to the memory location 1301_1 of the memory unit 1404a.

Referring to FIG. 15C, at time slot 3, the tensor Ta propagates from the memory location 1301_2 of the memory unit 1404a to the memory location 1301_3 of the memory unit 1404a, the tensor Tb propagates from the memory location 1301_1 of the memory unit 1404a to the memory location 1301_2 of the memory unit 1404a, and the tensor Tc (e.g., which is output by the layer 1202a) is written to the memory location 1301_1 of the memory unit 1404a.

Referring to FIG. 15D, at time slot 4, the tensor Ta propagates from the memory location 1301_3 of the memory unit 1404a to the memory location 1301_4 of the memory unit 1404b, as well as is output via the read head 1408a. Merely as an example, at time slot 4, this tensor Ta is transmitted via a skip connection, to the summation block 1204e of FIG. 12. Also, the tensor Tb propagates to the memory location 1301_3 of the memory unit 1404a, the tensor Tc propagates to the memory location 1301_2 of the memory unit 1404a, and the tensor Td (e.g., which is output by the layer 1202a) is written to the memory location 1301_1 of the memory unit 1404a.

Referring to FIG. 15E, at time slot 5, the tensor Ta propagates from the memory location 1301_4 of the memory unit 1404b to the memory location 1301_5 of the memory unit 1404b. The tensor Tb propagates from the memory location 1301_3 of the memory unit 1404a to the memory location 1301_4 of the memory unit 1404b, and also is output via the read head 1408a. The tensor Tc propagates from the memory location 1301_2 of the memory unit 1404a to the memory location 1301_3 of the memory unit 1404a, the tensor Td propagates from the memory location 1301_1 of the memory unit 1404a to the memory location 1301_2 of the memory unit 1404a, and the tensor Te (e.g., which is output by the layer 1202a) is written to the memory location 1301_1 of the memory unit 1404a.

Referring to FIG. 15F, at time slot 6, the tensor Ta propagates from the memory location 1301_5 of the memory unit 1404b to the memory location 1301_6 of the memory unit 1404b, the tensor Tb propagates from the memory location 1301_4 of the memory unit 1404b to the memory location 1301_5 of the memory unit 1404b, the tensor Tc propagates from the memory location 1301_3 of the memory unit 1404a to the memory location 1301_4 of the memory unit 1404b (and also output via the read head 1408a), the tensor Td propagates from the memory location 1301_2 of the memory unit 1404a to the memory location 1301_3 of the memory unit 1404a, the tensor Te propagates from the memory location 1301_1 of the memory unit 1404a to the memory location 1301_2 of the memory unit 1404a, and the tensor Tf (e.g., which is output by the layer 1202a) is written to the memory location 1301_1 of the memory unit 1404a.

Referring to FIG. 15G, at time slot 7, the tensor Ta propagates from the memory location 1301_6 of the memory unit 1404b to the memory location 1301_7 of the memory unit 1404c, as well as output by the read head 1408b. Merely as an example, at time slot 7, this tensor Ta is transmitted, via a skip connection, to the summation block 1204h of FIG. 12. The various other tensors Tb, . . . , Tf propagate sequentially from a corresponding memory location to a subsequent memory location, as illustrated. Also, the tensor Tg (e.g., which is output by the layer 1202a) is written to the memory location 1301_1 of the memory unit 1404a.

Referring to FIG. 15H, at time slot 8, the various tensors Ta, . . . , Tg propagate from a corresponding memory location to a subsequent memory location in the chain of memory locations, as illustrated. Also, the tensor Th (e.g., which is output by the layer 1202a) is written to the memory location 1301_1 of the memory unit 1404a.

Referring to FIG. 15I, at time slot 9, the various tensors Tb, . . . , Th propagate from a corresponding memory location to a subsequent memory location in the chain of memory locations, as illustrated. Also, the tensor Ti (e.g., which is output by the layer 1202a) is written to the memory location 1301_1 of the memory unit 1404a. Furthermore, the tensor Ta is purged from the chain of memory locations, and is output by the read head 1408c. Merely as an example, at time slot 9, this tensor Ta is transmitted, via a skip connection, to the summation block 1204j of FIG. 12.

In FIGS. 15D-15I, at any given time slot, the read head 1408a outputs the tensor that advances from the memory location 1301_3 of the memory unit 1404a to the memory location 1301_4 of the memory unit 1404b. That is, the read head 1408a is at the end memory location 1301_3 of the memory unit 1404a. However, this is merely an example, and at any given time slot, the read head 1408a can read any tensor that is stored in any of the other memory locations 1301_1 or 1301_2 of the memory unit 1404a. Thus, tensor read access at the read head 1408a is arbitrary.

Similarly, tensor read access at the read head 1408b is also arbitrary in the sense that the read head 1408b can read, at any given time slot, a tensor output by any of the memory locations 1301_4, 1301_5, or 1301_6 of the memory unit 1404b.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

We disclose the following clauses.
Clause Set 1:
1. A method of processing partitions of a tensor in a target order, comprising:
 receiving, by a reorder unit and from two or more producer units, a plurality of partitions of a tensor in a first order that is different from the target order;
 storing the plurality of partitions in the reorder unit;
 providing, from the reorder unit, the plurality of partitions in the target order to one or more consumer units; and
 processing, by the one or more consumer units, the plurality of partitions in the target order.
2. The method of claim 1, wherein the plurality of partitions is a first plurality of partitions, the tensor comprises the first plurality of partitions and a second plurality of partitions, the target order is a concatenation of (i) a first target order that indicates a corresponding order of the first plurality of partitions and (ii) a second target order that indicates a corresponding order of the second plurality of partitions, and wherein the method further comprises:
 subsequent to providing the first plurality of partitions in the first target order to the one or more consumer units, issuing, by the reorder unit, a reset signal;
 subsequent to and in response to issuing the reset signal, receiving, by the reorder unit and from the two or more producer units, the second plurality of partitions of the tensor in a second order that is different from the second target order;
 storing the second plurality of partitions in the reorder unit;
 providing, from the reorder unit, the second plurality of partitions in the second target order to the one or more consumer units; and
 processing, by the one or more consumer units, the second plurality of partitions in the second target order.
3. The method of claim 2, further comprising:
 assigning, to each partition of the first plurality of partitions, a corresponding sequence identification (ID) of a first plurality of sequence IDs;
 assigning, to each partition of the second plurality of partitions, a corresponding sequence ID of a second plurality of sequence IDs,
 wherein the first plurality of sequence IDs are arranged in a first sequence that identifies the first target order of the corresponding first plurality of partitions, and the second plurality of sequence IDs are arranged in a second sequence that identifies the second target order of the corresponding second plurality of partitions.
4. The method of claim 3, further comprising:
 processing, by a first producer unit, the first plurality of sequence IDs in the first sequence, wherein processing, by the first producer unit, the first plurality of sequence IDs in the first sequence comprises:
  for each sequence ID in the first plurality of sequence IDs,
   (i) determining if the corresponding partition of the first plurality of partitions is stored in the first producer unit,
   (ii) if the corresponding partition is stored in the first producer unit, outputting the corresponding partition to the reorder unit and processing the next sequence ID in the first plurality of sequence IDs, and (ii) if the corresponding partition is not stored in the first producer unit, processing the next sequence ID in the first plurality of sequence IDs, without outputting any partition.
5. The method of claim 4, further comprising:
 subsequent to processing the first plurality of sequence IDs in the first sequence and subsequent to receiving the reset signal from the reorder unit, processing, by the first producer unit, the second plurality of sequence IDs in the second sequence.
6. The method of claim 2, wherein the reorder unit has a buffer depth that matches the first plurality of partitions, and that matches the second plurality of partitions.
7. The method of claim 1, wherein the reorder unit does not have sufficient storage space to store, at a given time, all the partitions of the tensor.
8. An integrated circuit, comprising:
 an array of configurable units, configurable units in the array of configurable units including producer configurable units, a reorder configurable unit, and consumer configurable units; and
 a data bus connected to the configurable units which communicates data at a data bus clock rate,
 wherein the producer configurable units are configured to store partitions of a tensor, and wherein the consumer configurable units are to require transmission of the partitions to the consumer configurable units for processing in a target order,
 wherein the producer configurable units are configured to deliver the partitions to the reorder configurable unit out of order, and are configured to provide to the reorder configurable units ordering information identifying the target order,
 wherein the reorder configurable unit is configured to use the ordering information to reorder the partitions in the target order, and to deliver the reordered partitions in the target order to the consumer configurable units, and
 wherein the consumer configurable units are configured to process the reordered partitions in the target order.
9. The integrated circuit of claim 8, further comprising a control bus connected to the configurable units which communicates control signals at a control bus clock rate.
10. The integrated circuit of claim 9, wherein the producer configurable units are configured to stop delivery of the partitions to the reorder configurable units when the reorder configurable units have received a batch of the partitions.
11. The integrated circuit of claim 10, wherein a size of the batch matches a buffer depth of the reorder configurable units.
12. The integrated circuit of claim 11, wherein the reorder configurable units are configured to send a read ready signal to the producer configurable units at the control bus clock rate to indicate that the reorder configurable unit is ready to receive an additional batch of partitions.
13. The integrated circuit of claim 12, wherein the producer configurable units are configured to reset the ordering logic after delivering the batch of the vectors to the reorder configurable units.
14. An integrated circuit, comprising:
 an array of configurable units, configurable units in the array of configurable units including processing units and reorder units;
 a data bus connected to the array of configurable units which communicates data at a data bus clock rate;
 the array of configurable units configured to partition a tensor into a plurality of subtensors, to distribute processing of subtensors in the plurality of subtensors across a set of the processing units at the data bus clock rate, and to require outputs generated from processing the subtensors to be in an order;
 processing units in the set of processing units that process the subtensors and generate the outputs, deliver the outputs to the reorder configurable units out of order, and are configured to provide to the reorder configurable units ordering information identifying the order;

reorder configurable units in the reorder configurable units configured to use the ordering information to reorder the outputs in the order, and to deliver the reordered outputs to another set of the processing units; and processing units in the another set of processing units configured to process the reordered outputs in the order.

15. The integrated circuit of claim 14, further comprising a control bus connected to the array of configurable units which communicates control signals at a control bus clock rate.

16. The integrated circuit of claim 15, wherein the processing units in the set of processing units are configured to stop delivery of the outputs to the reorder configurable units when the reorder configurable units have received a batch of the outputs.

17. The integrated circuit of claim 16, wherein a size of the batch matches a buffer depth of the reorder configurable units.

18. The integrated circuit of claim 17, wherein the reorder configurable units are configured to send a read ready signal to the processing units in the set of processing units at the control bus clock rate to indicate that the reorder configurable units are ready to receive an additional output.

19. The integrated circuit of claim 18, wherein the processing units in the set of processing units are configured to reset the ordering information after delivering the batch of the outputs to the reorder configurable units.

20. The integrated circuit of claim 14, wherein the ordering information identifying the order is embedded as a sequence identification (ID) associated with individual partitions of the tensor, wherein a sequence ID of a partition is stored in a corresponding metadata associated with the tensor.

Clause Set 2:

1. An integrated circuit, comprising:

a plurality of configurable units, each configurable unit having two or more corresponding sections, the plurality of configurable units arranged in a serial arrangement to form a chain of sections of the configurable units; and a data bus connected to the plurality of configurable units which communicates data at a clock rate, wherein the chain of sections is configured to receive and write a series of tensors at the clock rate at a first end section of the chain of sections, and sequentially propagate the series of tensors through individual sections within the chain of sections at the clock rate, such that a first tensor of the series of tensors is written to a first section of the chain of sections at a first clock cycle, and the first tensor is propagated and rewritten to a second section of the chain of sections at a second clock cycle, wherein the chain of sections is configured to output the series of tensors at a second end section of the chain of sections, the first end section and the second end section being two opposite end sections of the chain of sections, and wherein the chain of sections is configured to also output the series of tensors at an intermediate section of the chain of sections, the intermediate section between the first end section and the second end section of the chain of sections.

2. The integrated circuit of claim 1, wherein:

the first clock cycle and the second clock cycle are two consecutive clock cycles;

the first tensor and a second tensor are two consecutive tensors in the series of tensors;

the first section and the second section are two consecutive sections of the chain of sections, such that the first section is nearer the first end section than the second section, and the second section is nearer the second end section than the first section;

at the first clock cycle, the first section of the chain stores the first tensor; and at the second clock cycle, the first section of the chain stores the second tensor and the second section of the chain stores the first tensor.

3. The integrated circuit of claim 1, wherein:

a first configurable unit has two or more sections, and wherein the intermediate section is a last one of the two or more sections of the first configurable unit.

4. The integrated circuit of claim 1, wherein the intermediate section is a first intermediate section, and wherein:

the chain of sections is configured to also output the series of tensors at a second intermediate section of the chain of sections, the second intermediate section between the first end section and the second end section of the chain of sections.

5. The integrated circuit of claim 4, wherein:

a first configurable unit of the plurality of configurable units has two or more first sections, and the first intermediate section is a last one of the two or more first sections of the first configurable unit; and a second configurable unit of the plurality of configurable units has two or more second sections, and the second intermediate section is a last one of the two or more second sections of the second configurable unit.

6. The integrated circuit of claim 1, wherein:

the plurality of configurable units comprises at least a first configurable unit and a second configurable unit;

in the serial arrangement of the plurality of configurable units, the first configurable unit is immediately before the second configurable unit; and the series of tensors is propagated from a last one of two or more corresponding sections of the first configurable unit to a first one of two or more corresponding sections of the second configurable unit.

7. The integrated circuit of claim 1, wherein:

each section of each configurable unit of the plurality of configurable units is large enough to fully accommodate any one corresponding tensor of the series of tensors.

8. The integrated circuit of claim 1, wherein:

the series of tensors is output by a first layer of a neural network;

the series of tensors output at the intermediate section is received by a second layer of the neural network; and the series of tensors output at the second end section is received by a third layer of the neural network, wherein there are one or more first intermediate layers between the first layer and the second layer of the neural network, and wherein there are one or more second intermediate layers between the second layer and the third layer of the neural network.

9. The integrated circuit of claim 1, wherein:

at any given clock cycle, sections of individual configurable units store a corresponding contiguous, disjoint set of tensors.

10. A method of buffering a series of tensors and providing multiple access points to the buffered series of tensors, the method comprising:

configuring a plurality of configurable units in a serial arrangement, and partitioning address space of each configurable unit of the plurality of configurable units into corresponding sections, such that the serially arranged plurality of configurable units form a chain of sections;

writing, at a first end section of the chain of sections, a series of tensors at a clock rate;

sequentially propagating the series of tensors through individual sections within the chain of sections at the clock rate; and outputting the series of tensors on a second end section of the chain of sections and on an intermediate section of the chain of sections, the first end section and the second end section being two opposite end sections of the chain of sections, and the intermediate section between the first end section and the second end section of the chain of sections.

11. The method of claim 10, wherein sequentially propagating the series of tensors comprises:

writing, to a first section of the chain of sections at a first clock cycle, a first tensor of the series of tensors; and rewriting, to a second section of the chain of sections at a second clock cycle, the first tensor.

12. The method of claim 10, wherein:

the first clock cycle and the second clock cycle are two consecutive clock cycles;

the first tensor and a second tensor are two consecutive tensors in the series of tensors, such that the first tensor appear ahead of the second tensor in the series of tensors;

the first section and the second section are two consecutive sections of the chain of sections, such that the first section is nearer the first end section than the second section; and sequentially propagating the series of tensors further comprises at the second clock cycle, writing, to the first section of the chain, the second tensor.

13. The method of claim 10, wherein:

a first configurable unit has two or more sections, and wherein the intermediate section is a last one of the two or more sections of the first configurable unit.

14. The method of claim 10, wherein the intermediate section is a first intermediate section, and wherein the method comprises:

outputting the series of tensors on a second intermediate section of the chain of sections, the second intermediate section between the first end section and the second end section of the chain of sections.

15. The method of claim 14, wherein:

a first configurable unit of the plurality of configurable units has two or more first sections;

the first intermediate section is a last one of the two or more first sections of the first configurable unit;

a second configurable unit of the plurality of configurable units has two or more second sections; and the second intermediate section is a last one of the two or more second sections of the second configurable unit.

16. The integrated circuit of claim 1, wherein:

the plurality of configurable units comprises at least a first configurable unit and a second configurable unit;

in the serial arrangement of the plurality of configurable units, the first configurable unit is immediately before the second configurable unit; and sequentially propagating the series of tensors further comprises propagating the series of tensors from a last one of two or more corresponding sections of the first configurable unit to a first one of two or more corresponding sections of the second configurable unit.

17. The method of claim 10, further comprising:

at any given clock cycle, storing, in sections of individual configurable units, a corresponding contiguous, disjoint set of tensors.

18. An integrated circuit, comprising:

a plurality of configurable memory units, each configurable memory unit having two or more corresponding sections, the plurality of configurable units arranged in a serial arrangement to form a chain of sections of the configurable units; and a data bus connected to the plurality of configurable units which communicates data at a clock rate, wherein the chain of sections is configured to receive and write a series of tensors at the clock rate at a first end section of the chain of sections, and sequentially propagate the series of tensors through individual sections within the chain of sections at the clock rate, and wherein the chain of sections is configured to output the series of tensors at two or more access points in the chain of sections.

19. The integrated circuit of claim 18, wherein:

a first access point comprises a second end section of the chain of sections, the first end section and the second end section being two opposite end sections of the chain of sections.

20. The integrated circuit of claim 19, wherein:

a second access point comprises an intermediate section of the chain of sections, the intermediate section between the first end section and the second end section of the chain of sections.

The invention claimed is:

1. A method of providing partitions of a tensor in a target order to one or more consumer units of an array of configurable units, the tensor comprising (i) a first plurality of partitions and (ii) a second plurality of partitions, wherein the target order is a concatenation of (i) a first target order for the first plurality of partitions and (ii) a second target order for the second plurality of partitions, the method comprising:

receiving, by a reorder unit of the array of configurable units and from two or more producer units of the array of configurable units, the first plurality of partitions of the tensor in a first order that is different from the first target order;

providing, from the reorder unit, the first plurality of partitions in the first target order to the one or more consumer units;

subsequent to and in response to providing the first plurality of partitions in the first target order from the reorder unit to the one or more consumer units, receiving, by the reorder unit and from the two or more producer units, the second plurality of partitions of the tensor in a second order that is different from the second target order; and providing, from the reorder unit, the second plurality of partitions in the second target order to the one or more consumer units;

wherein the one or more consumer units, the reorder unit, and the two or more producer units are configurable units of the array of configurable units.

2. The method of claim 1, further comprising:

subsequent to and in response to providing the first plurality of partitions in the first target order from the reorder unit to the one or more consumer units, issuing, by the reorder unit, a reset signal, wherein receiving the second plurality of partitions of the tensor in the second order comprises:

subsequent to and in response to the two or more producer units receiving the reset signal, receiving, by the reorder unit and from the two or more producer units, the second plurality of partitions of the tensor in the second order.

3. The method of claim 2, further comprising:
refraining, by the two or more producer units, from transmitting any partition of the second plurality of partitions of the tensor to the reorder unit prior to the issuance of the reset signal.

4. The method of claim 2, further comprising:
refraining, by the two or more producer units, from transmitting any partition of the first plurality of partitions of the tensor to the reorder unit subsequent to the issuance of the reset signal.

5. The method of claim 1, further comprising:
assigning, to each partition of the first plurality of partitions, a corresponding sequence identification (ID) of a first plurality of sequence IDs; and
assigning, to each partition of the second plurality of partitions, a corresponding sequence ID of a second plurality of sequence IDs,
wherein the first plurality of sequence IDs are arranged in a first sequence that identifies the first target order of the corresponding first plurality of partitions, and the second plurality of sequence IDs are arranged in a second sequence that identifies the second target order of the corresponding second plurality of partitions.

6. The method of claim 5, further comprising:
processing, by a first producer unit of the array of configurable units, the first plurality of sequence IDs in the first sequence, wherein processing, by the first producer unit, the first plurality of sequence IDs in the first sequence comprises:
for each sequence ID in the first plurality of sequence IDs, (i) determining if the corresponding partition of the first plurality of partitions is stored in the first producer unit, (ii) if the corresponding partition is stored in the first producer unit, outputting the corresponding partition to the reorder unit and processing the next sequence ID in the first plurality of sequence IDs, and (ii) if the corresponding partition is not stored in the first producer unit, processing the next sequence ID in the first plurality of sequence IDs, without outputting any partition.

7. The method of claim 6, further comprising:
subsequent to and in response to providing the first plurality of partitions in the first target order from the reorder unit to the one or more consumer units, issuing, by the reorder unit, a reset signal; and
subsequent to processing the first plurality of sequence IDs in the first sequence and subsequent to receiving a reset signal from the reorder unit, processing, by the first producer unit, the second plurality of sequence IDs in the second sequence.

8. The method of claim 1, wherein the reorder unit does not have sufficient storage space to store, at a given time, all the partitions of the tensor.

9. A non-transitory computer readable storage medium impressed with computer program instructions, the instructions, when executed on a processor, implement a method of providing partitions of a tensor in a target order to one or more consumer units of an array of configurable units, the tensor comprising a plurality of partitions that includes (i) a first plurality of partitions of the tensor and (ii) a second plurality of partitions of the tensor, the method comprising:
storing, by a first producer unit of the array of configurable units, a first subset of the plurality of partitions, and storing, by a second producer unit of the array of configurable units, a second subset of the plurality of partitions;
first transmitting (i) by the first producer unit, those partitions of the first subset, which are included in the first plurality of partitions, to a reorder unit of the array of configurable units and (ii) by the second producer unit, those partitions of the second subset, which are included in the first plurality of partitions, to the reorder unit;
issuing, by the reorder unit and subsequent to the first transmitting, a reset signal;
subsequent to the issuance of the reset signal, second transmitting (i) by the first producer unit, those partitions of the first subset, which are included in the second plurality of partitions, to the reorder unit, and (ii) by the second producer unit, those partitions of the second subset, which are included in the second plurality of partitions, to the reorder unit:
wherein the one or more consumer units, the reorder unit, and the first and second producer units are configurable units of the array of configurable units.

10. The non-transitory computer readable storage medium of claim 9, further comprising:
receiving, by the reorder unit and prior to the issuance of the reset signal, the first plurality of partitions that includes (i) those partitions of the first subset, which are included in the first plurality of partitions and which are received from the first producer unit, and (ii) those partitions of the second subset, which are included in the first plurality of partitions and which are received form the second producer unit; and
providing, by the reorder unit and prior to the issuance of the reset signal, the first plurality of partitions to the one or more consumer units.

11. The non-transitory computer readable storage medium of claim 9, wherein:
the target order is a concatenation of (i) a first target order for the first plurality of partitions and (ii) a second target order for the second plurality of partitions;
receiving, by the reorder unit, the first plurality of partitions comprises receiving, by the reorder unit, the first plurality of partitions in an order that is different from the first target order; and
providing, by the reorder unit, the first plurality of partitions to the one or more consumer units comprises providing, by the reorder unit, the first plurality of partitions to the one or more consumer units in the first target order.

12. The non-transitory computer readable storage medium of claim 9, further comprising:
receiving, by the reorder unit and subsequent to the issuance of the reset signal, the second plurality of partitions that includes (i) those partitions of the first subset, which are included in the second plurality of partitions and which are received from the first producer unit, and (ii) those partitions of the second subset, which are included in the second plurality of partitions and which are received form the second producer unit; and
providing, by the reorder unit and subsequent to the issuance of the reset signal, the second plurality of partitions to the one or more consumer units.

13. The non-transitory computer readable storage medium of claim 12, wherein:
- the target order is a concatenation of (i) a first target order for the first plurality of partitions and (ii) a second target order for the second plurality of partitions;
- receiving, by the reorder unit, the second plurality of partitions comprises receiving, by the reorder unit, the second plurality of partitions in an order that is different from the second target order; and
- providing, by the reorder unit, the second plurality of partitions to the one or more consumer units comprises providing, by the reorder unit, the second plurality of partitions to the one or more consumer units in the second target order.

14. The non-transitory computer readable storage medium of claim 12, wherein the reorder unit does not have sufficient storage space to store, at a given time, all the partitions of the tensor.

15. An integrated circuit, comprising:
- an array of configurable units, configurable units in the array of configurable units including a plurality of producer configurable units, a reorder configurable unit, and one or more consumer configurable units; and
- a data bus connected to the array of configurable units which communicates data at a data bus clock rate,
- wherein the plurality of producer configurable units is configured to store a first plurality and a second plurality of partitions of a tensor, such that first one or more partitions of the tensor are stored in a first producer configurable unit and second one or more partitions of the tensor are stored in a second producer configurable unit,
- wherein the one or more consumer configurable units are to require transmission of (i) the first plurality of partitions to the one or more consumer configurable units in a first target order for processing, and (ii) the second plurality of partitions to the one or more consumer configurable units in a second target order for processing,
- wherein the plurality of producer configurable units is configured to deliver the first plurality of partitions to the reorder configurable unit in an order that is different from the first target order, wherein the reorder configurable unit is configured to deliver the first plurality of partitions in the first target order to the one or more consumer configurable units,
- wherein the reorder configurable unit is configured to issue a read ready signal, in response to transmission of the first plurality of partitions to the one or more consumer configurable units,
- wherein the plurality of producer configurable units is configured to, in response to the read ready signal, deliver the second plurality of partitions to the reorder configurable unit in another order that is different from the second target order, and
- wherein the reorder configurable unit is configured to deliver the second plurality of partitions in the second target order to the one or more consumer configurable units.

16. The integrated circuit of claim 15, wherein the one or more consumer configurable units are configured to process the first and second plurality of partitions in the target order that is a concatenation of the first target order and the second target order.

17. The integrated circuit of claim 15, further comprising a control bus connected to the configurable units which communicates control signals at a control bus clock rate.

18. The integrated circuit of claim 15, wherein a size of a larger of the first or second plurality of partitions matches a buffer depth of the reorder configurable units.

19. The integrated circuit of claim 15, wherein the first target order is embedded as a sequence identification (ID) associated with individual partitions of the first plurality of partitions, and wherein the second target order is embedded as a sequence ID associated with individual partitions of the second plurality of partitions.

20. The integrated circuit of claim 19, wherein a sequence ID of a partition is stored in a corresponding metadata associated with the tensor.

* * * * *